US011938480B2

(12) United States Patent
King et al.

(10) Patent No.: US 11,938,480 B2
(45) Date of Patent: Mar. 26, 2024

(54) MICROFLUIDIC DIAGNOSTIC DEVICE WITH A THREE-DIMENSIONAL (3D) FLOW ARCHITECTURE

(71) Applicant: The Board of Trustees of the University of Illinois, Urbana, IL (US)

(72) Inventors: William P. King, Champaign, IL (US); Rashid Bashir, Champaign, IL (US); Mehmet Y. Aydin, Urbana, IL (US); Jacob E. Berger, Champaign, IL (US); Enrique Valera, Champaign, IL (US)

(73) Assignee: THE BOARD OF TRUSTEES OF THE UNIVERSITY OF ILLINOIS URBANA, ILLINOIS, Urbana, IL (US)

( * ) Notice: Subject to any disclaimer, the term of this patent is extended or adjusted under 35 U.S.C. 154(b) by 317 days.

(21) Appl. No.: 17/316,900

(22) Filed: May 11, 2021

(65) Prior Publication Data

US 2021/0354139 A1 Nov. 18, 2021

Related U.S. Application Data

(60) Provisional application No. 63/024,692, filed on May 14, 2020.

(51) Int. Cl.
*B01L 3/00* (2006.01)

(52) U.S. Cl.
CPC ... *B01L 3/502738* (2013.01); *B01L 3/502707* (2013.01); *B01L 3/502753* (2013.01);
(Continued)

(58) Field of Classification Search
None
See application file for complete search history.

(56) References Cited

U.S. PATENT DOCUMENTS 7,909,502 B2 * 3/2011 Ehrfeld ................ B01F 25/422
366/DIG. 3
8,628,729 B2 1/2014 Carrilho et al.
(Continued)

OTHER PUBLICATIONS

Tani et al., Chip-Based Bioassay Using Bacterial Sensor Strains Immobilized in Three-Dimensional Microfluidic Network, 2004, Anal. Chem., 76, 6693-6697. (Year: 2004).*
(Continued)

*Primary Examiner* — Lore R Jarrett
(74) *Attorney, Agent, or Firm* — Crowell & Moring LLP

(57) ABSTRACT

A microfluidic diagnostic device with a three-dimensional (3D) flow architecture comprises a polymeric body having first and second opposing surfaces and comprising first flow channels in the first opposing surface, second flow channels in the second opposing surface, and connecting flow passages extending through a thickness of the polymeric body to connect the first flow channels to the second flow channels, thereby defining a continuous 3D flow pathway in the polymeric body. The microfluidic diagnostic device also includes a first cover adhered to the first opposing surface to seal the first flow channels, a second cover adhered to the second opposing surface to seal the second flow channels, and one or more access ports in fluid communication with the continuous 3D flow pathway for introducing liquid reagent(s) and/or a sample into the polymeric body.

24 Claims, 18 Drawing Sheets

(52) U.S. Cl.
CPC ... *B01L 2200/10* (2013.01); *B01L 2300/0681* (2013.01); *B01L 2300/087* (2013.01); *B01L 2300/0887* (2013.01); *B01L 2400/0478* (2013.01); *B01L 2400/049* (2013.01); *B01L 2400/0677* (2013.01)

(56) References Cited

U.S. PATENT DOCUMENTS

| | | | |
|---|---|---|---|
| 9,555,382 B2 | 1/2017 | Clime et al. | |
| 10,203,307 B2 * | 2/2019 | Wang | G01N 30/06 |
| 11,198,904 B2 * | 12/2021 | Cai | B01L 3/50273 |
| 2011/0028669 A1 | 2/2011 | Robotti | |
| 2015/0258544 A1 * | 9/2015 | Stern | B01L 3/502746 506/40 |

OTHER PUBLICATIONS

Chan et al., Direct, one-step molding of 3D-printed structures for convenient fabrication of truly 3D PDMS microfluidic chips, 2015, Microfluid Nanofluid, 19, 9-18. (Year: 2015).*
Amin, R. et al., "3D-Printed Microfluidic Devices," Biofabrication, 8, 022001, (2016), pp. 1-17.
Anciaux, S. K., 3D Printed Micro Free-Flow Devices, Anal. Chem., 88 (2016) 7675-7682.
Au, A. K. et al., "3D-printed microfluidic automation," Lab on a Chip, 15 (2015), pp. 1934-1941.
Au, A. K. et al., "Mail-order microfluidics: Evaluation of stereolithography for the production of microfluidic devices," Lab on a Chip, 14 (2014), pp. 1294-1301.
Baumann, E. et al., "Hemolysis of human erythrocytes with saponin affects the membrane structue," Acta Histochem, 102 (2000), pp. 21-35.
Bhargava, K. C. et al., "Discrete Elements for 3D Microfluidics," PNAS, 111, 42, (2014), pp. 15013-15018.
Bhattacharjee, N. et al., "The Upcoming 3D-Printing Revolution in Microfluidics," Lab on a Chip, 16, 10 (2016), pp. 1720-1742.
Brown, R. B. et al., "Current Techniques for Single-Cell Lysis," J. Royal. Soc. Interface 5 (2008) pp. 5131-5138.
Chen, D. et al., "An integrated, self-contained microfluidic cassette for isolation, amplification, and detection of nucleic acids," Biomed. Mircrodevices, 12 (2010) pp. 705-719.
Chen, W. et al., "Mobile Platform for Multiplexed Detection and Differentiation of Disease-Specific Nucleic Acid Sequences, Using Microfluidic Loop-Mediated Isothermal Amplification and Smartphone detection," Analytical Chemistry, 89 (2017), pp. 11219-11226.
Chen, Y. et al., "Point-of-care and visual detection of P. aeruginosa and its toxin genes by multiple LAMP and lateral flow nucleic acid biosensor," Biosensors and Bioelectronics, 81 (2016), pp. 317-323.
Chin, C. D. et al., "Commercialization of Microfluidic Point-of-Care Diagnostic Devices," Lab on a Chip, 12 (2012), pp. 2118-2134.
Curtis, K. A. et al., "Rapid detection of HIV-1 by Reverse-Transcription, Loop-Mediated Isothermal Amplification ( RT-LAMP)," Journal of Virological Methods, 151 (2008), pp. 264-270.
Damhorst, G. L. et al. "Smartphone-Imaged HIV-1 Reverse-Transcription Loop-Mediated Isothermal Amplification (RT-LAMP) on a Chip from Whole Blood," Engineering, 1, 3 (2015) pp. 324-335.
Donvito, L. et al., "Experimental Validation of a Simple, Low-Cost, T-Junction Droplet Generator Fabricated Through 3D Printing," Journal of Micromechanics Microengineering, 25, 035013 (2015), pp. 1-6.
Dou, M. et al., "A Versatile PDMS/Paper Hybrid Microfluidic Platform for Sensitive Infectious Disease Diagnosis," Analytical Chemistry, 86 (2014) pp. 7978-7986.
Ganguli, A. et al., "Hands-free smartphone-based diagnostics for simultaneous detection of Zika, Chikungunya, and Dengue at point-of-care," Biomed. Microdevices, 19, 73 (2017), pp. 1-13.
Ganguli, A. et al. "Pixelated Spatial Gene Expression Analysis From Tissue," Nature Communications, 9, 202 (2018), pp. 1-9.
Gelber, M. K. et al., "Model-Guided Design and Characterization of a High-Precision 3D Printing Process for Carbohydrate Glass," Additive Manufacturing, (2018), pp. 38-50.
Gelber, M. K. et al., "Monolithic Multilayer Microfluidics Via Sacrificial Molding of 3D-printed Isomalt," Lab on a Chip, 15 (2015), pp. 1763-1741.
Gibson, I. et al., "Additive manufacturing technologies: 3D printing, rapid prototyping, and direct digital manufacturing," second edition. Additive Manufacturing Technologies: 3D Printing, Rapid Prototyping, and Direct Digital Manufacturing, Second Edition, Springer, New York (2015), pp. 1-509.
Glick, C. C. et al., "Rapid Assembly of Multilayer Microfluidic Structures Via 3D-Printed Transfer Molding and Bonding," Microsystems Nanoengineering, 2, 16063 (2016), pp. 1-9.
Grösche, M. et al., "Microfluidic Chips for Life Sciences—A Comparison of Low Entry Manufacturing Technologies," Small, 15, 1901956 (2019), pp. 1-9.
Hassan, U. et al., "A point-of-care microfluidic biochip for quantification of CD64 expression from whole blood for sepsis stratification," Nature Communications, 8, 15949 (2017), pp. 1-12.
Hill, J. et al., "Loop-mediated isothermal amplification assay for rapid detection of common strains of *Escherichia coli*," Journal of Clinical Microbiology, 46, 8, (2008), pp. 2800-2804.
Hwang, K. Y. et al., "Miniaturized bead-beating device to automate full DNA sample preparation processes for Gram-positive bacteria," Lab on a Chip, 11 (2011) pp. 3649-3655.
Imperato, P. J. "The Potential of Diagnostics for Improving Community Health in Less Developed Countries," Journal Community Health, 10, 4 (1985), pp. 201-206.
Islam, M. S., et al., "A review on macroscale and microscale cell lysis methods," Micromachines, 8, 83 (2017), pp. 1-27.
Jain, M. et al., "Novel Index for Micromixing Characterization and Comparative Analysis," Biomicrofluidics, 4 (2010), pp. 031101-1-031101-8.
Lee, W. et al., "3D-Printed Micro Fluidic Device for the Detection of Pathogenic Bacteria Using Size-Based Separation in Helical Channel with Trapezoid Cross-Section," Scientific Reports, 5, 7717 (2015), pp. 1-7.
Liao, C. H et al., "Survivability and long-term preservation of bacteria in water and in phosphate-buffered saline," Letters in Applied Microbiology, 37 (2003), pp. 45-50.
Liu, Y. Z. et al., "Two-Fluid Mixing in a Microchannel," International Journal of Heat and Fluid Flow, 25 (2004) pp. 986-995.
Macdonald, N. P. et al., "Comparing Microfluidic Performance of Three-Dimensional (3D) Printing Platforms," Anal. Chem., 89 ( 2017), pp. 3858-3866.
Mahalanabis, M., et al., "Cell lysis and DNA extraction of gram-positive and gram-negative bacteria from whole blood in a disposable microfluidic chip," Lab Chip, 9 (2009), pp. 2811-2817.
Marentis, T. C. et al., "Microfluidic sonicator for real-time disruption of eukaryotic cells and bacterial spores for DNA analysis," Ultrasound in Medicine and Biology, 31, 9 (2005), pp. 1265-1277.
McGregor D. J. et al., "Automated Metrology and Geometric Analysis of Additively Manufactured Lattice Structures," Additive Manufacturing, 28 (2019) pp. 535-545.
Morgan, A. J. L. et al. "Simple and Versatile 3D Printed Microfluidics using Fused Filament Fabrication," PLoS One (Apr. 6, 2016) pp. 1-17.
Notomi, T. et al., "Loop-Mediated Isothermal Amplification of DNA," Nucleic Acids Research, 28, 12, (2000) pp. 1-7.
O'Neill, J., "Tackling Drug-Resistant Infections Globally: Final Report and Recommendations," Review on Antimicrobial Resistance (2016), pp. 1-84.
Packard, M et al., "Performance Evaluation of Fast Microfluidic Thermal Lysis of Bacteria for Diagnostic Sample Preparation," Diagnostics, 3 (2013), pp. 105-116.
Pantazis, A. K. et al. "3D-printed bioreactors for DNA amplification: application to companion diagnostics," Sensors and Actuators: B. Chemical, 319, 128161 (2020), pp. 1-8.

(56) References Cited

OTHER PUBLICATIONS

Park, J. et al., Thermal cycling characteristics of a 3D-printed serpentine microchannel for DNA amplification by polymerase chain reaction, Sensors Actuators A, 268 (2017) pp. 183-187.
Qiu, J. et al., "Rapid Customization of 3D Integrated Microfluidic Chips via Modular Structure-Based Design," ACS Biomaterials Sci. Eng., 3 (2017), pp. 2606-2616.
S. Razavi Bazaz et al., "3D Printing of Inertial Microfluidic Devices," Scientific Reports, 10, 5929 (2015), pp. 1-14.
Saavedra-Matiz, C. A. et al., "Cost-effective and scalable DNA extraction method from dried blood spots," Clinical Chemistry, 59, 7 (2013) pp. 1045-1051.
Schilling, E. A. "Cell lysis and protein extraction in a microfluidic device with detection by a fluorogenic enzyme assay," Anal. Chem. 74, (2002), pp. 1798-1804.
Sochol, R. D. et al., "3D Printed Microfluidic Circuitry Via Multijet-Based Additive Manufacturing," Lab on a Chip, 16 (2016), pp. 668-678.
Sweet, E. C. et al., "3D Printed Chaotic Mixer for Low Reynolds Number Microfluidics," 20th International Conference on Solid-State Sensors, Actuators and Microsystems, Berlin, Germany (Jun. 23-27, 2019), pp. 2258-2261.
Tofteberg, T. et al., "A Novel Passive Micromixer: Lamination in a Planar Channel System," Microfluid. Nanofluidics, 8 (2010), pp. 209-215.
Tanner, N. A.et al., "Visual detection of isothermal nucleic acid amplification using pH-sensitive dyes,". Biotechniques, 58 (2015) pp. 59-68.
Tumbleston, J. R. et al. "Continuous Liquid Interface Production of 3D Objects," Science, 347, 6228 (2015), pp. 1349-1352.
Wolk, D. et al., "Principles of Molecular Microbiology Testing Methods," Infectious Disease Clinics of North America, 15, 4 (2001), pp. 1157-1204.
Yager, P. et al. "Point-of-Care Diagnostics for Global Health," Annu. Rev. Biomed. Eng., 10 (2008) pp. 107-144.

* cited by examiner

MICROFLUIDIC DIAGNOSTIC DEVICE WITH A THREE-DIMENSIONAL (3D) FLOW ARCHITECTURE

RELATED APPLICATION

The present patent document claims the benefit of priority under 35 U.S.C. § 119(e) to U.S. Provisional Patent Application No. 63/024,692, which was filed on May 14, 2020, and is hereby incorporated by reference in its entirety.

FEDERALLY SPONSORED RESEARCH OR DEVELOPMENT

This invention was made with government support under cooperative agreement #D19AC00012 awarded by the Defense Advanced Research Projects Agency of the U.S. Department of Defense. The government has certain rights in the invention.

TECHNICAL FIELD

The present disclosure is related generally to microfluidic diagnostics and more specifically to miniature biochemical diagnostic devices for the detection of pathogens.

BACKGROUND

Microfluidic diagnostics have been under development for over 20 years. Commercialization of microfluidic devices has been limited, however, given the significant cost, time and technical challenges associated with moving from a prototype to a product; typically about five years and $25 million are required to move from development to manufacturing. Traditionally, microfluidic devices have been produced using injection molding and assembly processes, which may require tools that are slow and costly to make, and difficult to use. Injection molding also limits the devices to mostly two-dimensional (2D) shapes and flow architectures.

BRIEF SUMMARY

A microfluidic diagnostic device with a three-dimensional (3D) flow architecture that provides advantages over conventional microfluidic devices is described in this disclosure. Also described are a point-of-care diagnostic system and a diagnostic method utilizing the microfluidic diagnostic device, as well as a method of making the microfluidic diagnostic device.

The microfluidic diagnostic device comprises a polymeric body having first and second opposing surfaces and comprising first flow channels in the first opposing surface, second flow channels in the second opposing surface, and connecting flow passages extending through a thickness of the polymeric body to connect the first flow channels to the second flow channels, thereby defining a continuous 3D flow pathway in the polymeric body. The microfluidic diagnostic device also includes a first cover adhered to the first opposing surface to seal the first flow channels, a second cover adhered to the second opposing surface to seal the second flow channels, and one or more access ports in fluid communication with the continuous 3D flow pathway for introducing liquid reagent(s) and/or a sample (e.g., a biological sample) into the polymeric body.

BRIEF DESCRIPTION OF THE DRAWINGS

in FIG. 1C, exemplary front and back covers used to seal the 3D flow pathway and prevent fluid leakage are illustrated. Typically, the front and back covers are optically transparent, and thus they may not be visible or shown in all figures.

DETAILED DESCRIPTION

Described herein is a microfluidic diagnostic device or "chip" that includes a three-dimensional (3D) flow architecture that allows for improvements in on-chip mixing, chemical and biological functionality, and a reduced form factor compared to conventional microfluidic devices with 2D flow architectures. The improved microfluidic chip may be part of a point-of-care diagnostic system used to detect pathogens (e.g, viruses, bacteria, fungi, mold, yeasts or other infectious agents) from biological samples or samples collected from the environment. The improved microfluidic chip may also or alternatively be part of a point-of-care diagnostic system used to monitor or diagnose a medical condition (e.g, pregnancy, blood sugar level, or other medical conditions) from biological samples. The disposable or reusable microfluidic device may be fabricated using additive manufacturing methods that allow for a rapid transition from design to production. The inventors have demonstrated the ability to design, fabricate, and test functional microfluidic devices having 3D flow architectures within a time period of 6 to 24 hours.

Figure 1A:
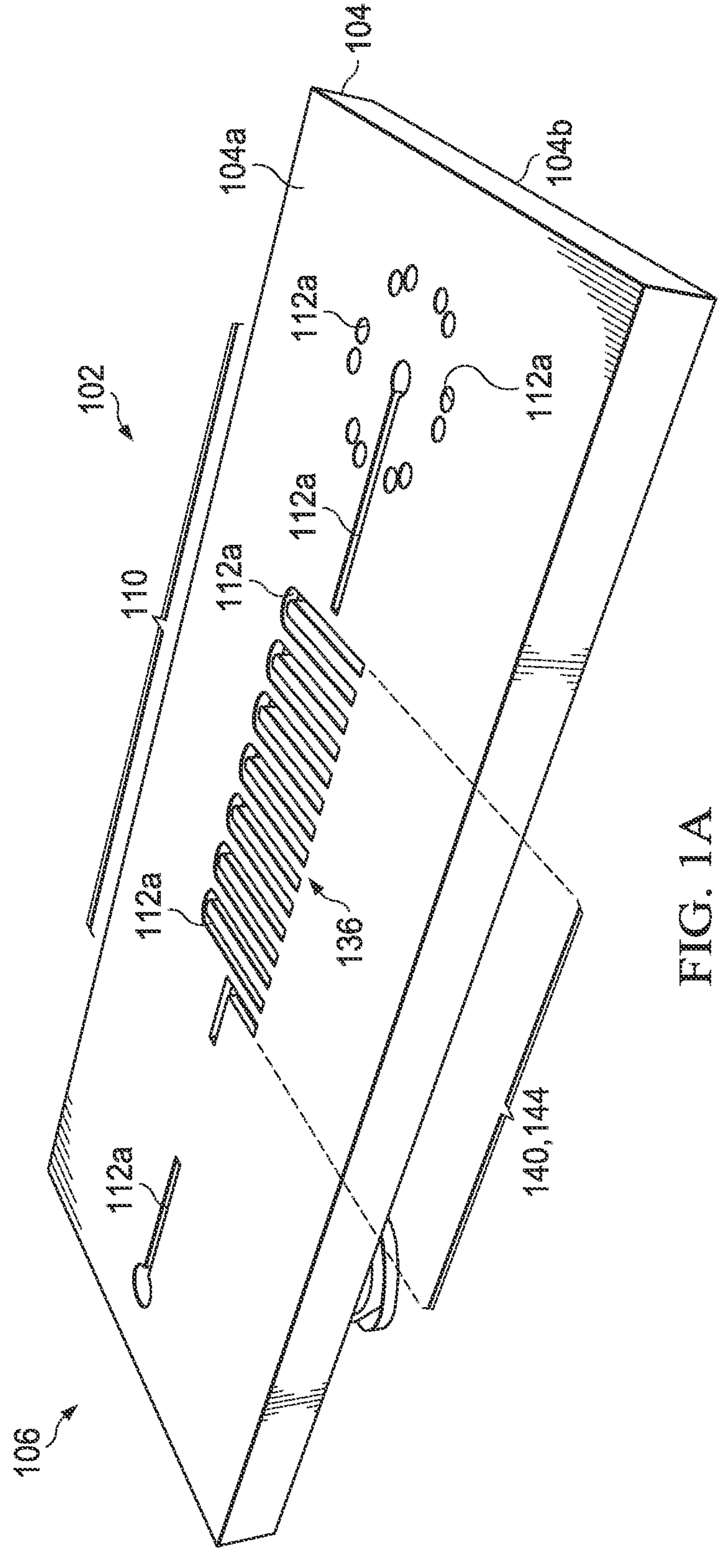
FIGS. 1A-1C show front and back views of an exemplary microfluidic diagnostic chip that includes a continuous 3D flow pathway for microfluidic diagnostics.
Figure 1B:
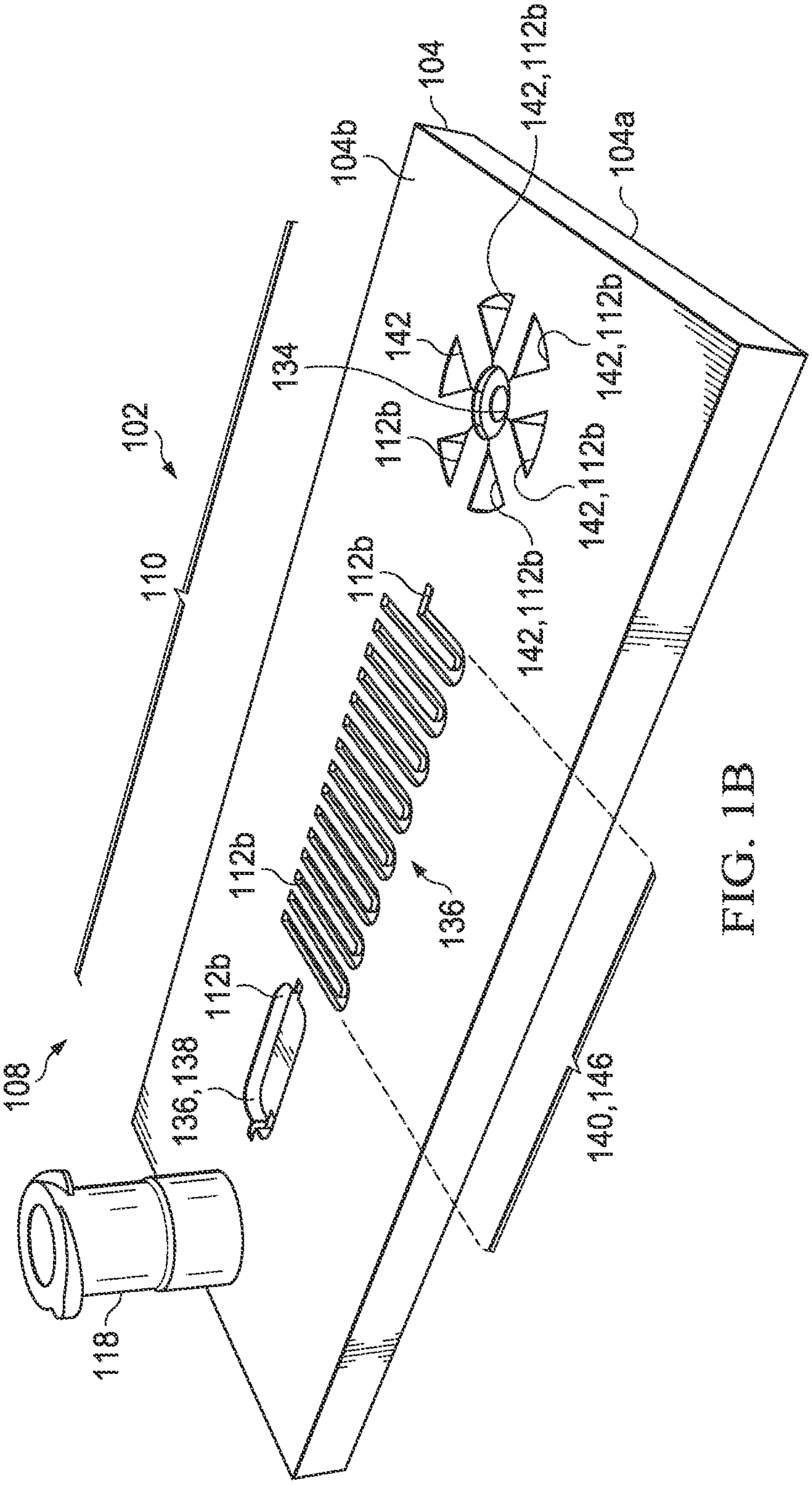
Figure 1C:
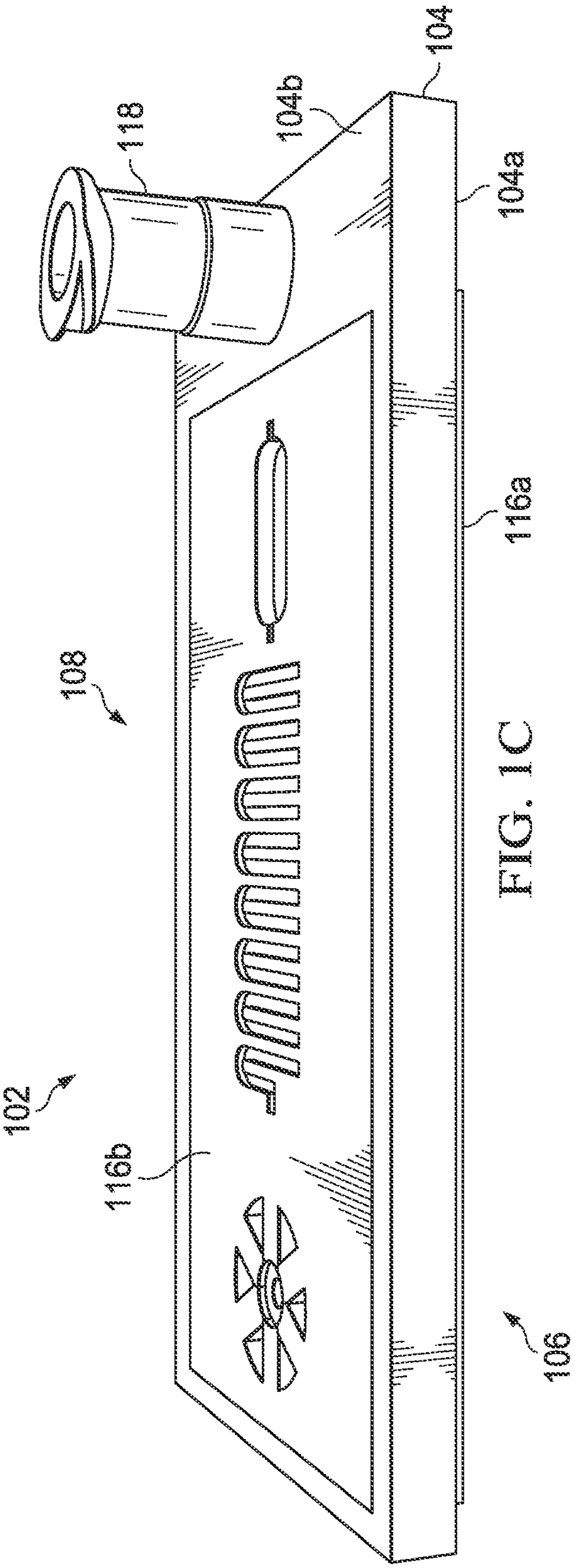

FIGS. 1A-1C show an exemplary microfluidic diagnostic chip 102 that may be suitable for detection of a pathogen such as the SARS-Cov-2 virus, *E. coli*, Methicillin-resistant *Staphylococcus aureus*, or others. The microfluidic chip 102 includes a polymeric body 104 comprising first and second opposing surfaces 104*a*,104*b* that define a front 106 and back 108 of the device 102, respectively. The polymeric body 104 includes a continuous 3D flow pathway 110 for on-chip diagnostics that comprises first flow channels 112*a* in the first opposing surface 104*a*, second flow channels 112*b* in the second opposing surface 104*b*, and connecting flow passages 114 (not visible in this figure) extending through the thickness of the polymeric body 104 to connect the first flow channels 112*a* to the second flow channels 112*b*. The connecting flow passages 114 may follow an orthogonal, straight, angled, curved, and/or bent path between the first and second flow channels 112*a*,112*b*. One or more access ports 118 are in fluid communication with the continuous 3D flow pathway 110 for introducing liquid reagent(s) and/or a sample, which is typically a biological sample (e.g., blood, saliva, urine), into the polymeric body 104.

Referring to FIG. 1C, the chip 102 includes a first cover 116*a* adhered to the first opposing surface 104*a* to seal the first flow channels 112*a*, and a second cover 116*b* adhered to the second opposing surface 104*b* to seal the second flow channels 112*b*, thereby preventing fluid leakage from the device 102. After sealing, the microfluidic diagnostic device may withstand a fluid pressure of up to about 180 Pa. Other types of sealing methods, for example, utilizing a glue adhesive or mechanical attachment, may allow for higher fluid pressures.

The first and second covers 116*a*,116*b* may comprise glass or a polymer that is preferably nonreactive with biological samples and reagents. In some examples, the covers 116*a*,116*b* may comprise a polymer, glass, ceramic, metal, and/or composite material. One or both covers 116*a*, 116*b* may have additional functions or may be combined or integrated with other materials or components to provide additional functionality. For example, one or both covers 116*a*,116*b* may be combined with an optical element such as an optical filter or material tailored for fluorescence detection measurements. The integrated optical function could include an optical sensor, an optical filter, or an optical amplifier.

Each of the first and second covers 116*a*,116*b* may have a microscale thickness (e.g., 10-100 microns) or a larger thickness (e.g., 0.1-3 mm). Typically, at least one of the first cover 116*a* and the second cover 116*b* is optically transparent; optical transparency is important when an optical reader is employed for detection, as discussed further below. One or both of the first and second covers 116*a*,116*b* can be opaque, partially transparent, or selectively transparent to certain optical wavelengths. For example, the cover 116, 116*b* can be tailored to permit transmission of optical wavelengths specific to the diagnostic test being performed. In one example, one or both covers 116*a*,116*b* may comprise adhesive tape (e.g., transparent adhesive tape) which is readily available commercially and enables easy sealing of the first and second flow channels 112*a*,112*b*. While generally necessary for diagnostic use of the microfluidic chip 102, the first and second covers 116*a*,116*b* may not be illustrated or visible in all figures.

One or both covers 116*a*,116*b* or the polymeric body 104 can have integrated electrical elements such as circuit wiring to permit transmission of electrical signals, an electrical antenna, an electrical sensor, a battery, or a radio for wireless transmission of electrical signals. For example, one or both covers 116*a*,116*b* or the polymeric body 104 may be integrated with an electrical sensor such as a resistive sensor, a capacitive sensor, a semiconducting sensor or other sensor with electrical function. The sensor can be tailored to detect the presence of certain chemicals, specific molecules, or biological material.

As will be discussed in more detail below in reference to particular examples, the continuous 3D flow pathway 110 in the polymeric body 104 may include one or more functional structures to facilitate fluid transport, mixing, lysing, amplification, storage and/or detection. These functional structures may include flow channel junction(s) 132, flow channel split(s) or furcation(s) 134, mixing structure(s) 136 (such as mixing chamber(s) 138 and/or mixing channel(s) 140, and/or detection reservoir(s) 142. These functional structures may be formed on the front 106 and/or the back 108 of the chip 102 by some combination of the flow channels 112*a*,112*b* and/or the connecting flow passage(s) 114.

Notably, the microfluidic diagnostic chip 102 is not limited to the geometry, size and/or flow architecture shown in FIGS. 1A-1C; other configurations are possible and various examples are described in this disclosure. The first and second flow channels 112*a*,112*b* and the connecting flow passages 114 may have any length, width, depth and configuration suitable for the intended use. Typically, the continuous 3D flow pathway 110 contains a total volume of about 10 μL to about 1000 μL and may include feature sizes (e.g., flow channel dimensions) in the micro- to millimeter range. Due to the 3D flow architecture, the microfluidic chip 102 itself may be compact in size, with a length of 100 mm (~4 in) or less, a width of about 50 mm (~2 in) or less, and a thickness of about 5 mm (~0.2 in) or less being typical. In some examples, the length may be about 60 mm or less, the width may be about 30 mm or less, and the thickness may be about 3 mm or less. Additionally, the microfluidic chip 102 is not limited to a planar configuration; in some examples the microfluidic device 102 may have a T-shape or an L-shape, or a curved geometry, as described below.

Figure 2:
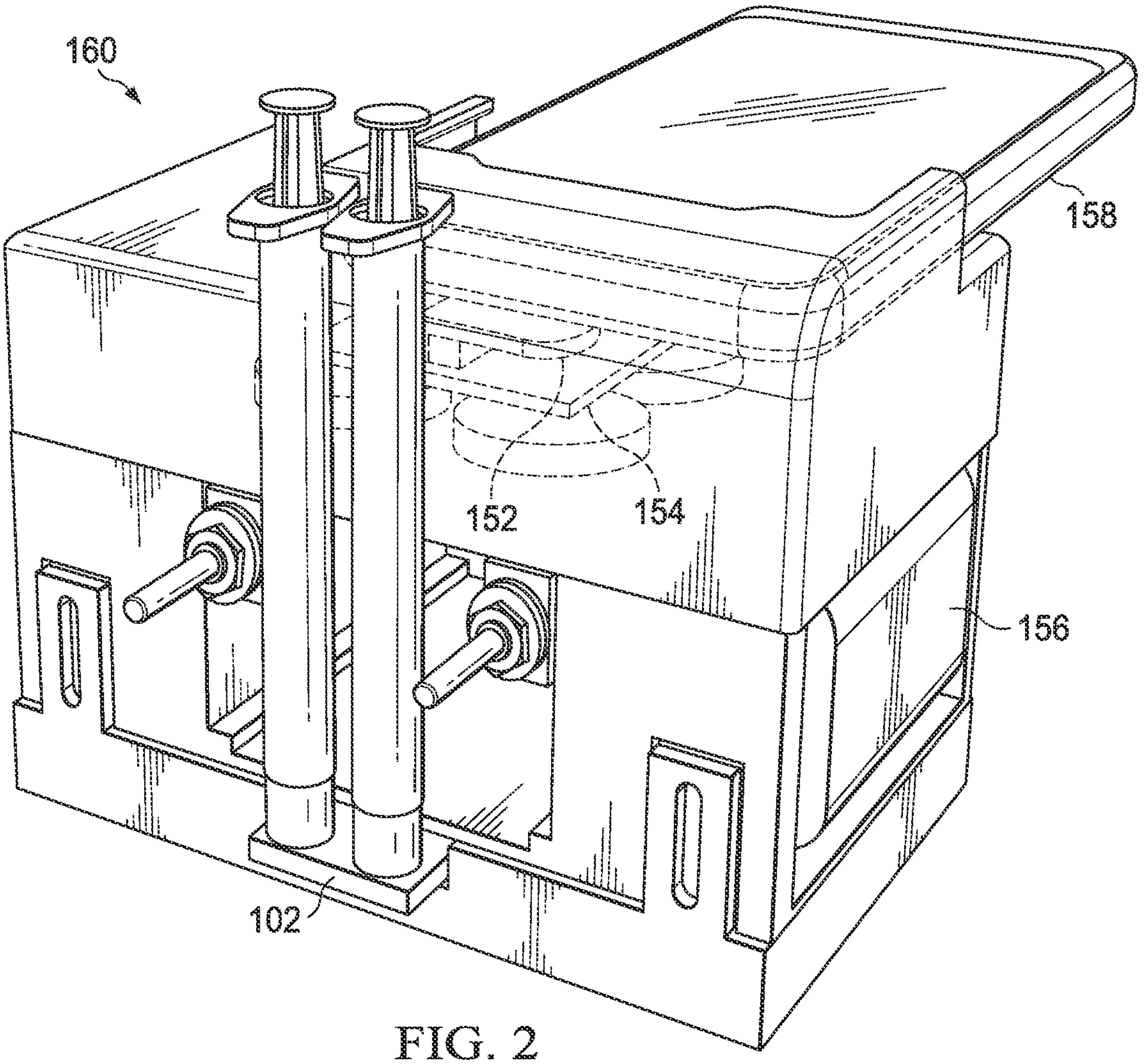
FIG. 2 illustrates an exemplary point-of-care diagnostic system utilizing a microfluidic diagnostic chip according to any embodiment or example in this disclosure.

Before going into further detail about the design of the microfluidic diagnostic device 102, a method of implementing point-of-care diagnostics using such a device is described. The method entails providing the microfluidic diagnostic chip 102 according to any embodiment or example in this disclosure and introducing one or more liquid reagents and a sample sequentially or simultaneously into the one or more access ports 118. The sample may be a biological sample taken from one or more organisms, a sample taken from the environment, or a sample taken from other sources such as an indoor surface, an outdoor surface, a supply of food or water, a body or stream of air or water, a device tailored to collect or capture pathogens, or a filter material. The liquid reagent(s) and the sample may be introduced in a predetermined sequence and/or at controlled flow rates, utilizing syringes or pumps to control the flow. Once introduced into the one or more access ports 118, the reagent(s) and sample are delivered to the continuous 3D flow path 110 in the polymeric body 104, where reactions and/or mixing occur and a processed fluid sample is formed and contained. The microfluidic diagnostic chip 102 is then positioned such that an optical detector 160 has line-of-sight access to the processed fluid sample, as shown in FIG. 2, and light is impinged on the processed fluid sample to carry out optical detection. The processed fluid sample may be contained in one or more detection reservoirs 142 on the microfluidic diagnostic chip 102. The optical detector 160 may be configured for use with a smart phone 158, as illustrated. The smart phone 158 may be employed for image collection, analysis, storage and/or transmission.

The point-of-care method described herein is capable of analyzing a sample and in some cases providing information about the analysis close to the location where the sample is collected. The method can therefore provide an analysis of a sample in a manner that does not require the sample to be stored or transported to a laboratory, and thus the analysis may be completed more quickly. The point-of-care method may be capable of testing smaller numbers of samples than are typically preferred in a laboratory setting; for example, one or fewer than ten samples may be tested, whereas conventional laboratory equipment is typically configured to analyze ten or more samples in parallel.

As indicated above, the microfluidic device 102 includes one or more access ports 118 for introducing fluids into the polymeric body 104, where each access port 118 is in fluid communication with the continuous 3D flow pathway 110. As used herein, the phrase “X is in fluid communication with Y” means that X and Y are configured such that fluid is free to flow between them. In other words, X and Y are either directly connected to each other, or connected to each other via one or more intermediate structures that do not obstruct fluid flow. The one or more access ports 118 may be integrally formed with the polymeric body 104.

Figure 3A:
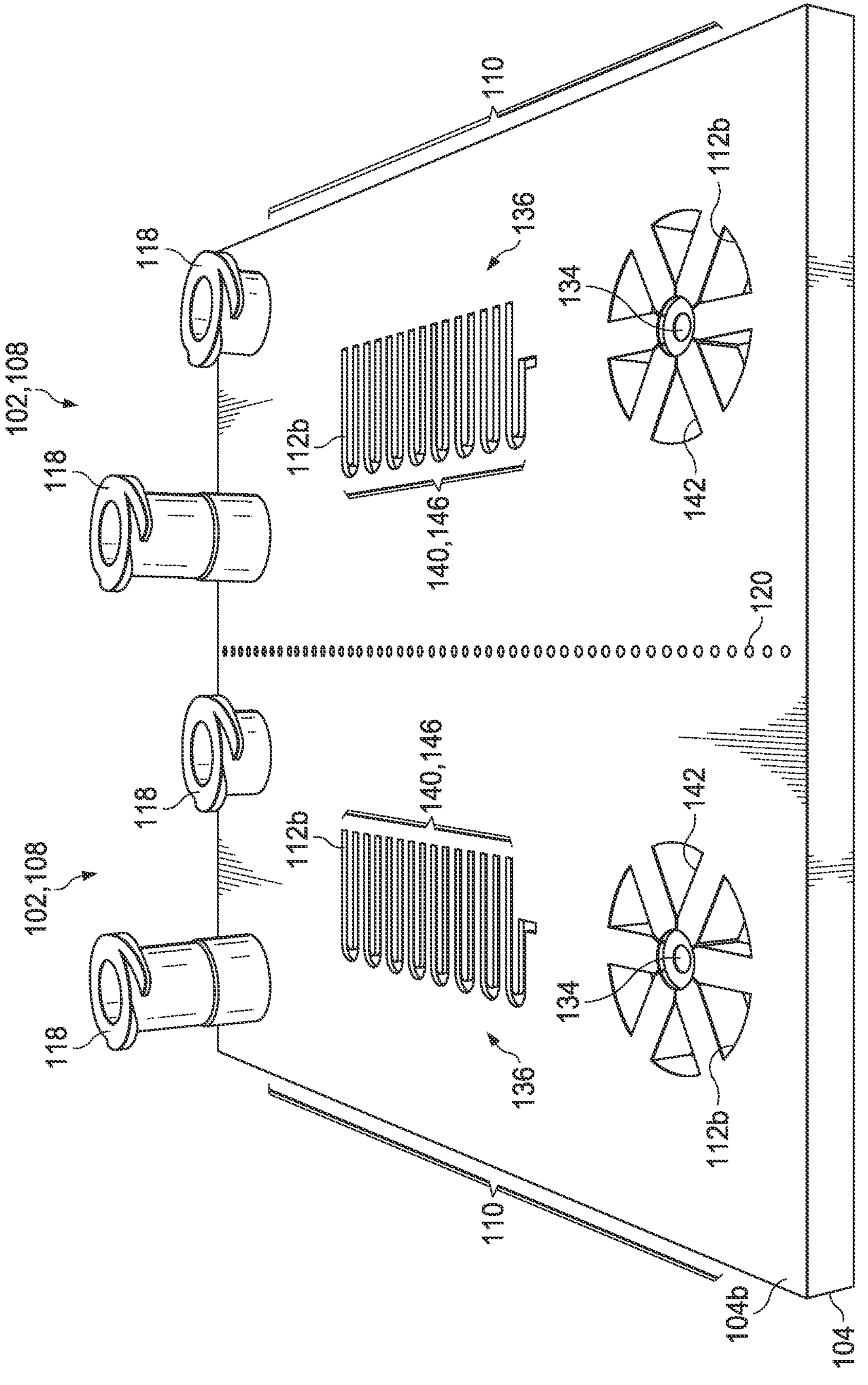
FIGS. 3A and 3B show back and front views of two adjacent microfluidic diagnostic chips configured for separation along a perforated midline; each chip includes two access ports for introduction of fluids.
Figure 3B:
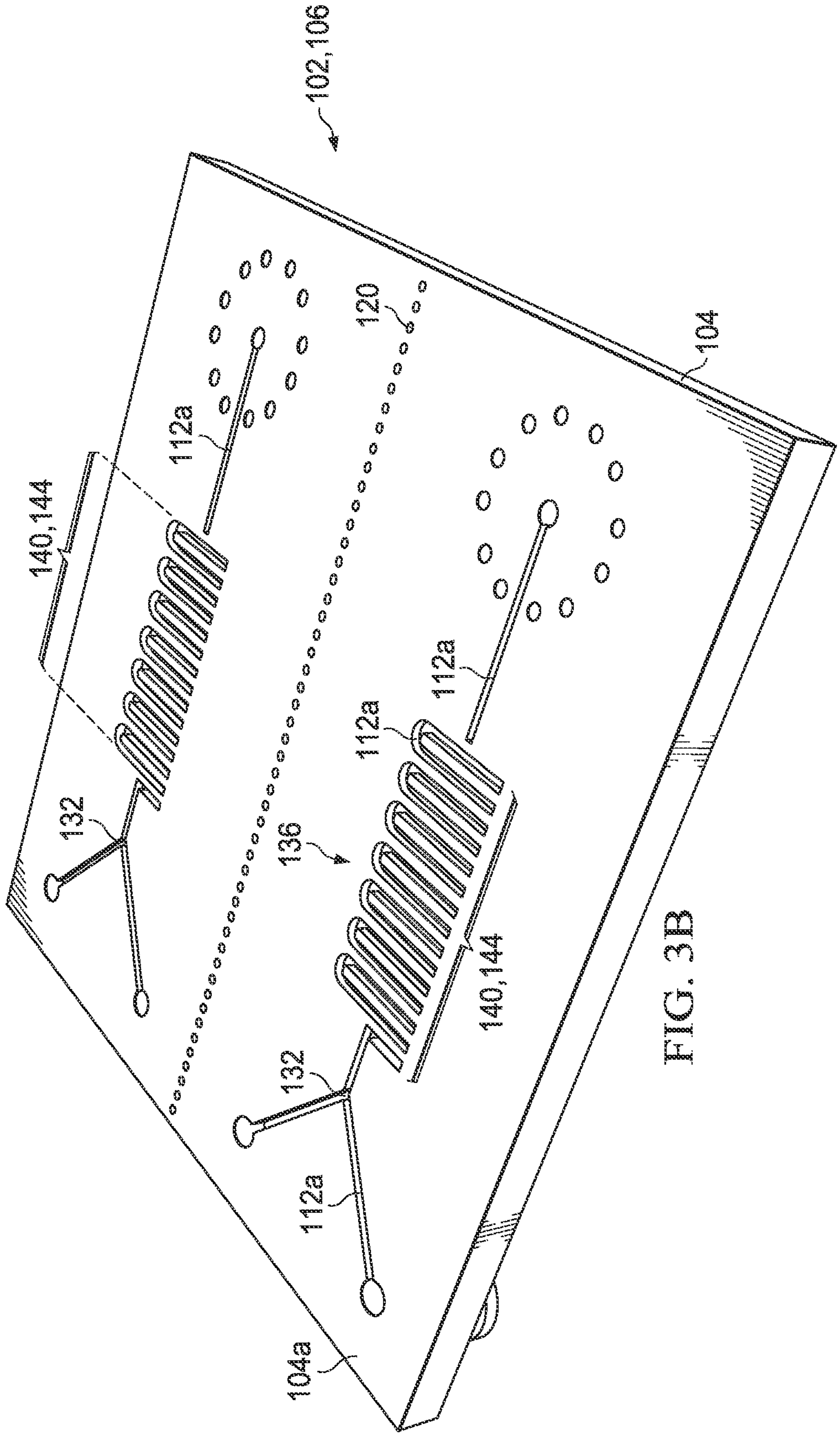
Figure 6:
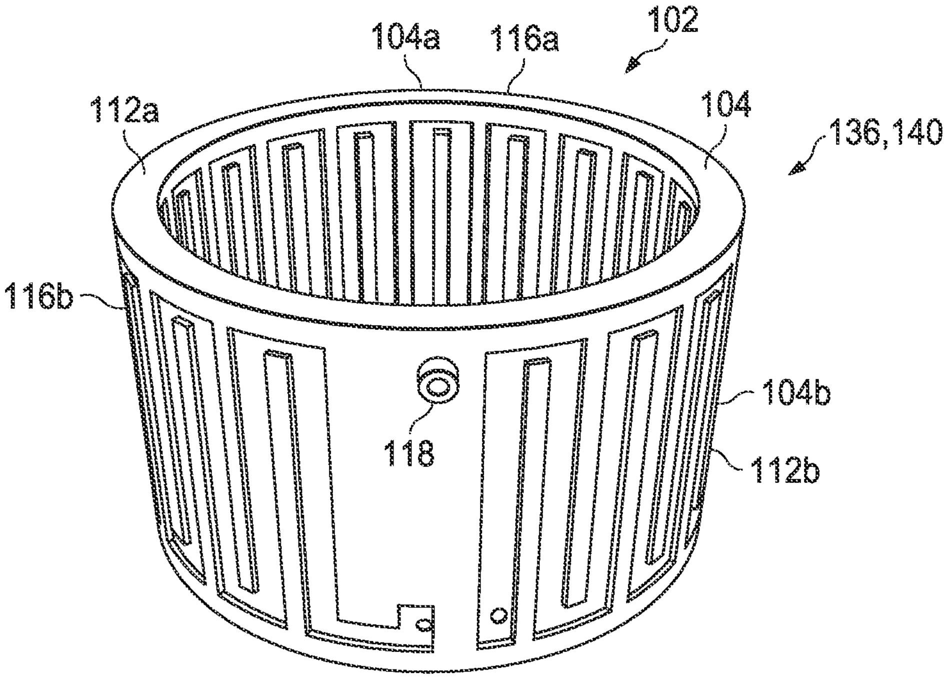
FIG. 6 shows an exemplary microfluidic diagnostic device comprising a curved polymeric body.

Typically, the access port(s) 118 are disposed on one of the first and second opposing surfaces 104*a*,104*b* of the polymeric body 104. In the example of FIGS. 1A-1C, a single access port 118 is positioned on the second opposing surface 104*b*, or the back 108 of the chip 102. With this configuration, a sample and liquid reagent(s) may be introduced sequentially through the single access port 118; the sequentially introduced sample and reagent(s) may accumulate in the mixing chamber 138 in a pre-mixing step prior to being flowed through the mixing channel 140 and delivered to the detection reservoirs 142. In other examples, more than one access port 118 may be positioned on the first and/or second opposing surfaces 104*a*,104*b*, as shown in FIG. 3A. In this example, two adjacent microfluidic chips 102 are configured for separation along a perforated midline 120 of the polymeric body 104, and two access ports 118 are provided on the back 108 of each chip 102, one for delivery of liquid reagent(s) and the other for delivery of a sample. Also or alternatively, the microfluidic chip 102 may include additional side surfaces that include one or more access ports 118, as illustrated for example in FIGS. 4A and 4B, and as discussed further below. The ports 118 may be positioned on surfaces that may be planar and not parallel to the first opposing surface 104*a*, as shown, or on surfaces that are not planar, such as a curved surface as illustrated in FIG. 6, which is described below. In a configuration with multiple (two or more) access ports 118, the liquid reagent(s) and sample may be introduced simultaneously or sequentially through different access ports 118, and the fluids may come together at one or more flow channel junctions 132, as shown for example in FIGS. 3B, 4A and 4B.

Figure 4A:
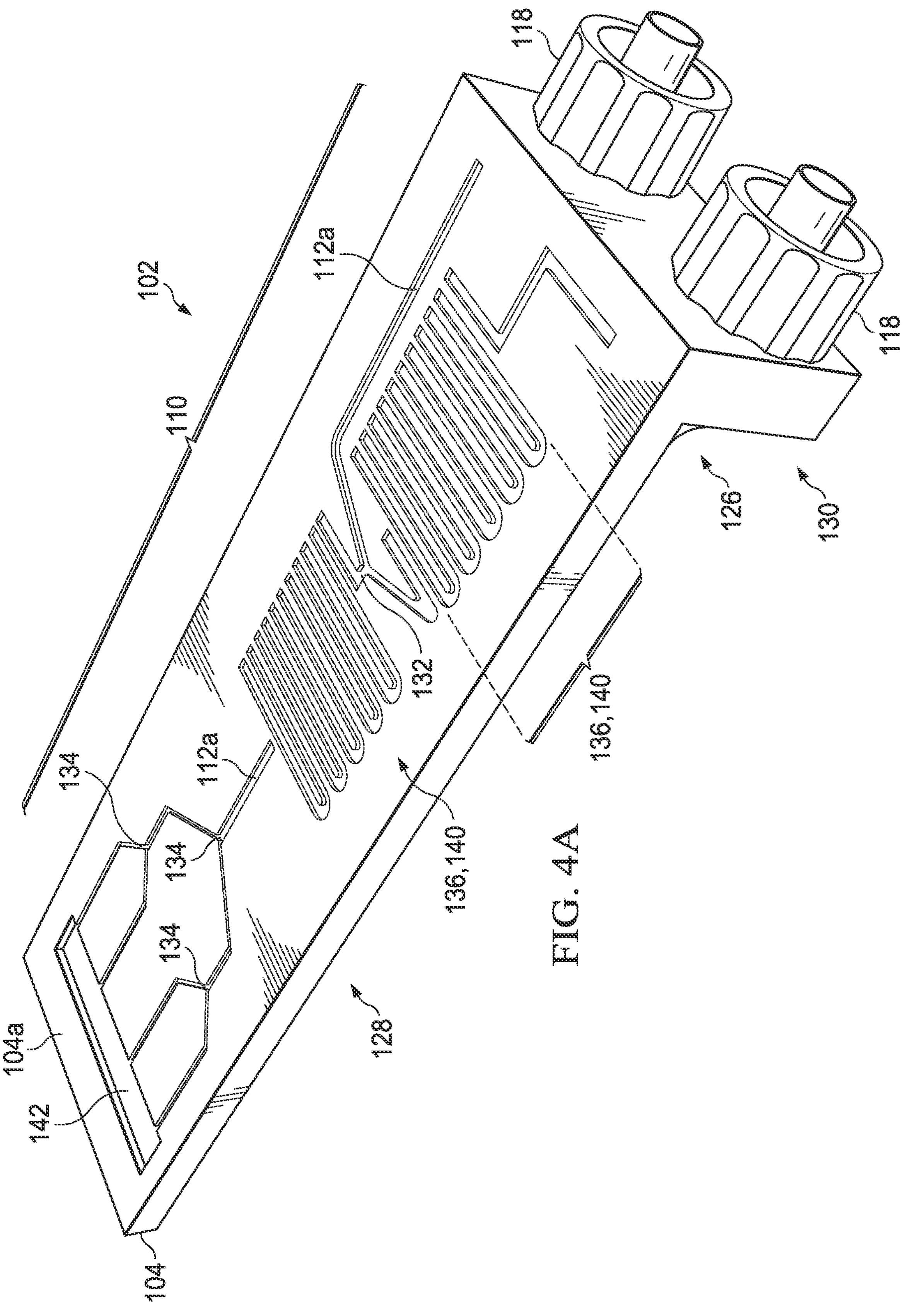
FIGS. 4A and 4B show exemplary microfluidic diagnostic chips having multiple access ports on additional side surfaces.
Figure 4B:
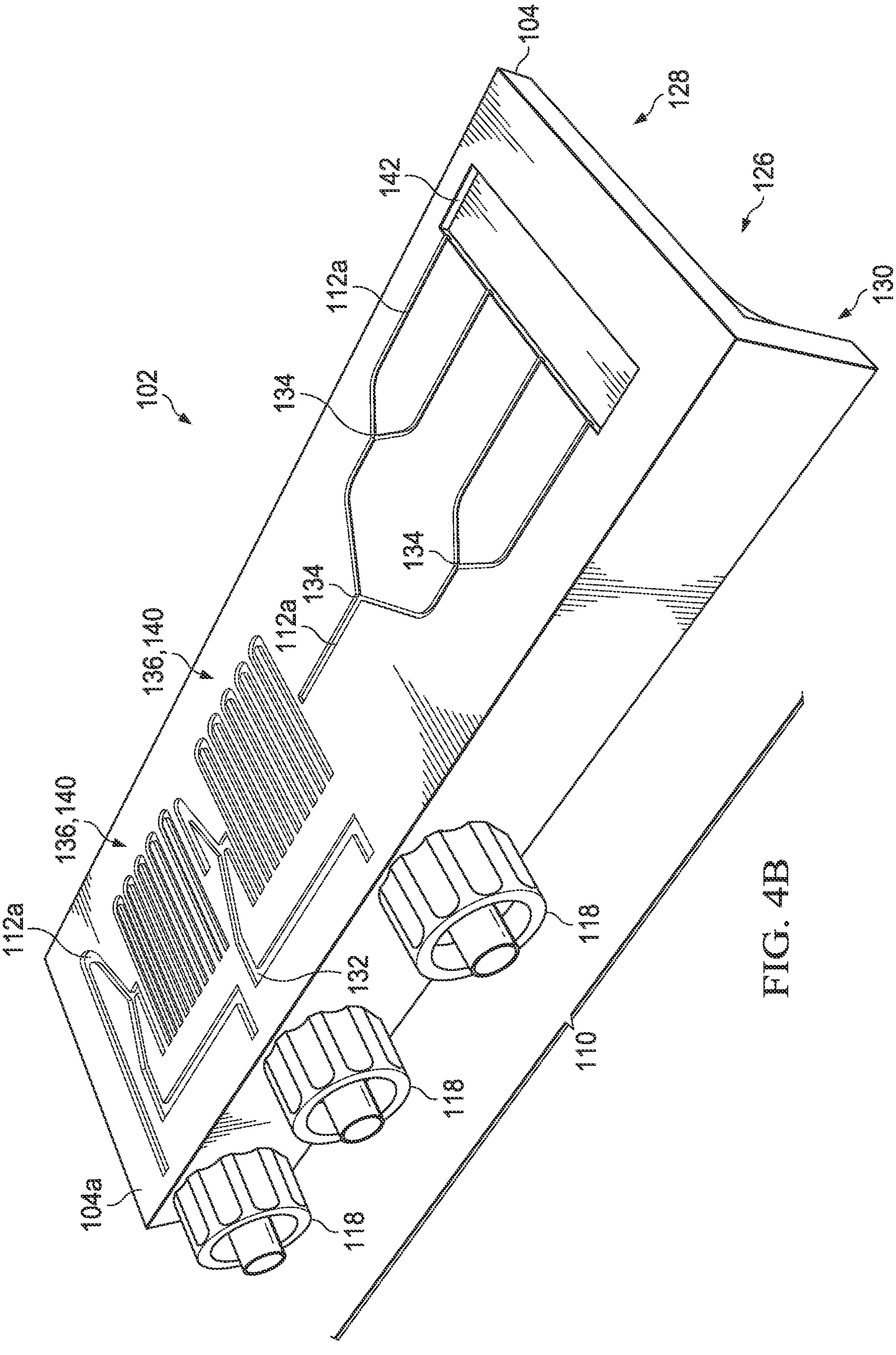
Figure 4C:
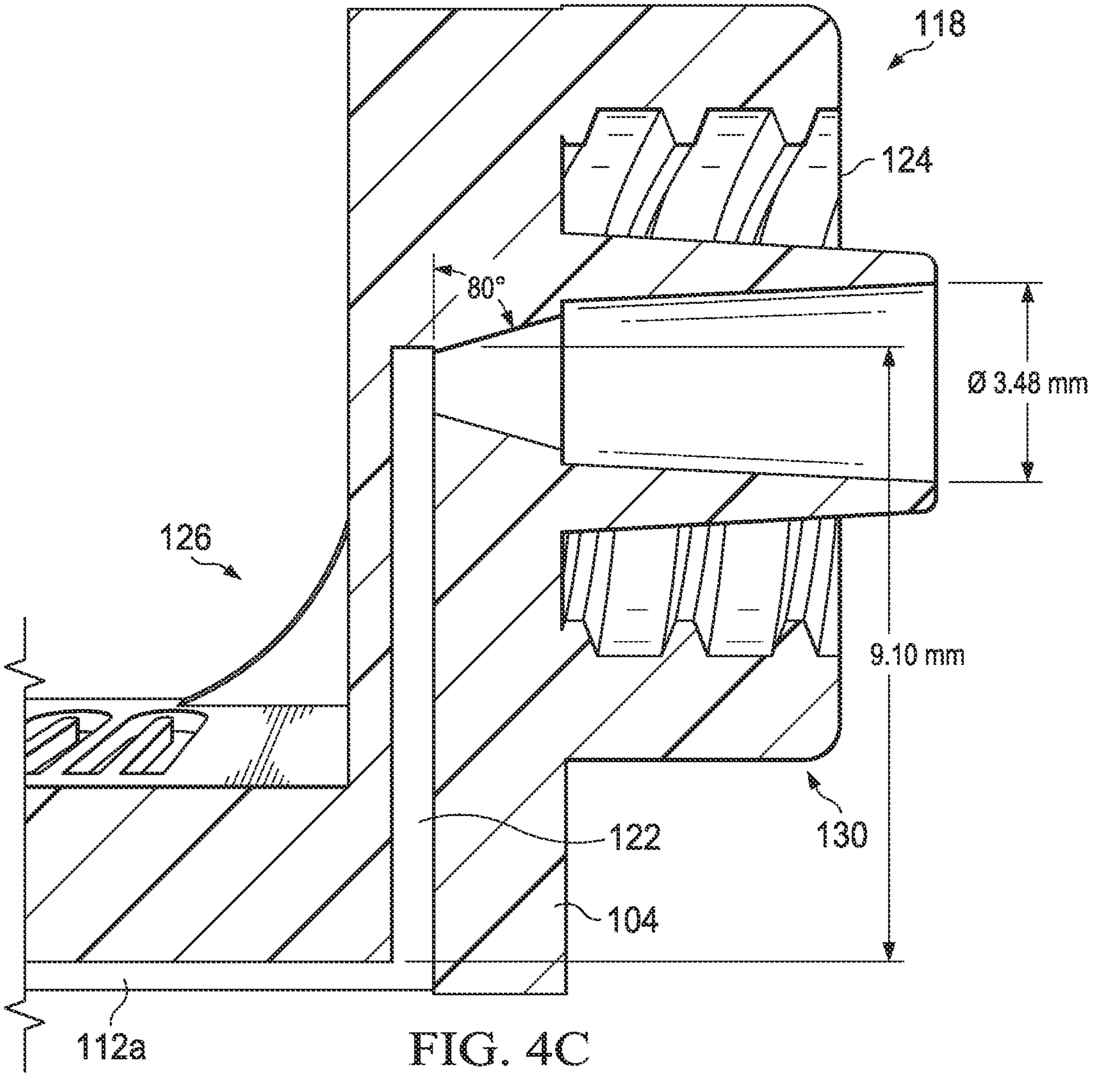
FIG. 4C is a sectional schematic showing details of the access ports.
Figure 5:
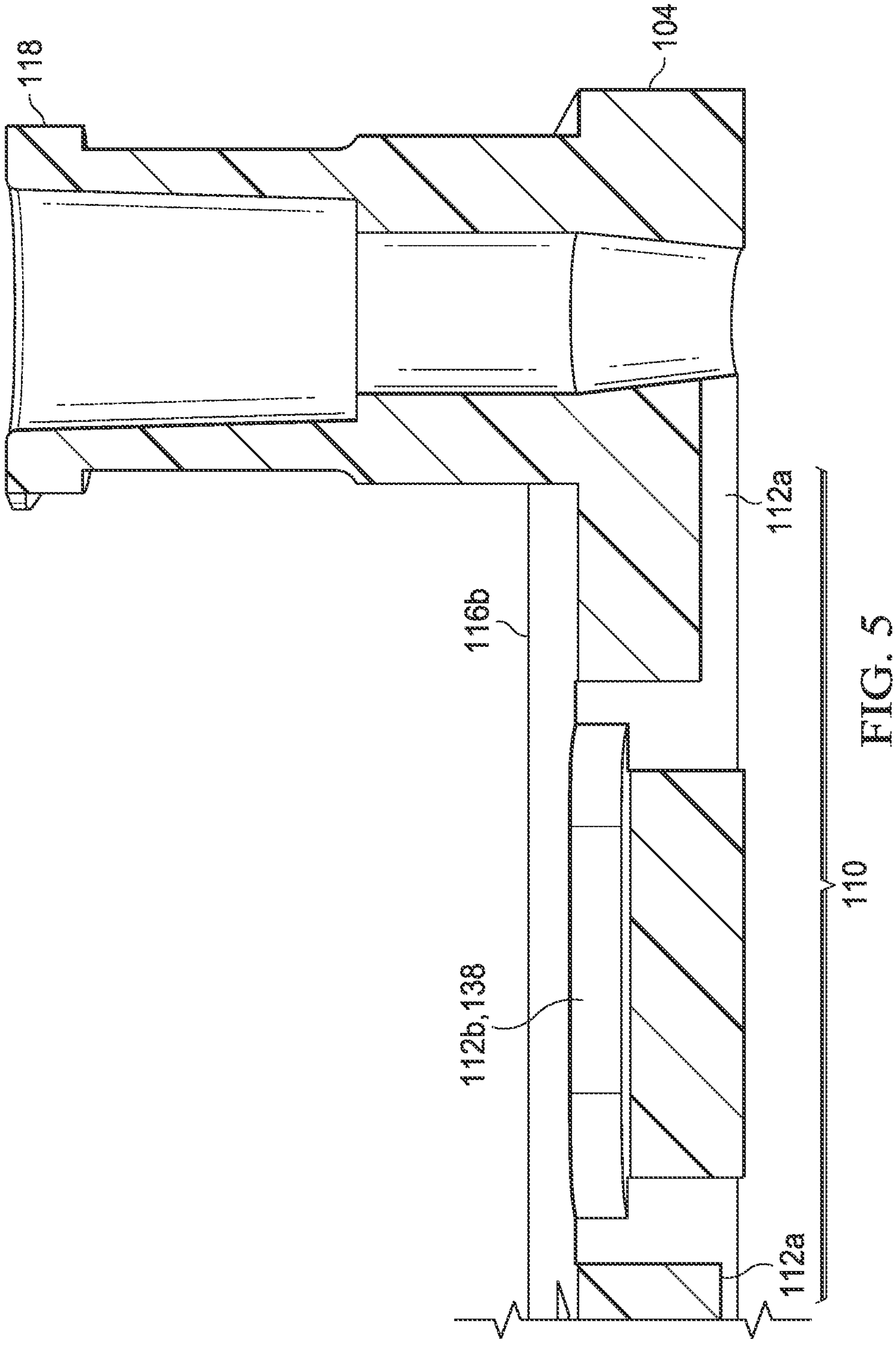
FIG. 5 is a sectional schematic showing part of the microfluidic diagnostic device of FIGS. 1A-1C including the access port.

Each access port 118 may be configured to contain and/or connect to a swab, another microfluidic cartridge, a needle, a syringe, or a tube, which may supply the one or more liquid reagents and/or a sample to the microfluidic device 102. It is also conceivable that the access port(s) 118 may be employed to release or remove fluids from the polymeric body 104, if needed. FIG. 4C illustrates internal details of the access ports 118 shown in FIGS. 4A and 4B, and FIG. 5 provides a sectional view of the access port 118 shown in FIGS. 1A-1C. Referring to FIGS. 4C and 5, the access port(s) 118 may have a tapered, conical and/or stepped internal diameter conducive to avoiding clogging and optionally for establishing a fit to accommodate mating with a swab, tube, syringe, needle, or cartridge. For example, ports with a tapered, conical and/or stepped internal diameter are desirable for tailoring fluid flows, reagent utilization and volume, or accommodating specific biochemical processing steps. Tapered, stepped or conical fluid ports can be manufactured with some types of additive manufacturing but generally cannot be made using injection molding. Also or alternatively, as shown in FIG. 4C, one or more of the access ports 118 may include threads 124 to couple with a mating connector (e.g., “Luer lock” fitting) attached to the tube or syringe. Each access port 118 is either directly connected to the continuous 3D flow pathway 110, as illustrated for example in FIG. 5, or directly connected to an internal channel 122 in the polymeric body 104 that connects with the continuous 3D flow pathway 110, as illustrated in FIG. 4C.

The polymeric body 104 comprises a polymer that is preferably non-reactive with biological samples and reagents. Suitable polymers may be thermosetting polymers and may include, for example, polyurethane, acrylates and/or epoxides. Other suitable polymers may be thermoplastic polymers such as polylactic acid (PLA) or acrylonitrile butadiene styrene (ABS). Suitable polymers may also include polymers whose shape or chemistry is formed by means of exposure to radiation such as white light, ultraviolet light, or a laser. Given the amenability of the microfluidic chip 102 to additive manufacturing, such as 3D printing, fused deposition modeling, extrusion-based additive manufacturing, vat photopolymerization, or continuous liquid interface production (CLIP) as described below, the polymeric body 104 may be described as a monolithic polymeric body devoid of any bonds or seams.

Both the first and second opposing surfaces 104*a*,104*b* of the polymeric body 104 may be planar, as in the examples described so far, meaning that the opposing surfaces 104*a*, 104*b* are substantially flat, with the exception of surface indentations associated with the first and second flow channels 112*a*,112*b*. More generally speaking, at least one of the first and second opposing surfaces 104*a*,104*b* may be planar.

In other examples, one or both of the first and second opposing surfaces 104*a*,104*b*, and consequently the polymeric body 104, may include a curve (or bend), such that the polymeric body 104 is curved or bent. For example, FIG. 6 shows a curved polymeric body 104 that may be used in a centrifuge to control fluid flow. In other words, the first and second flow channels 112*a*,112*b* and/or the connecting flow passages 114 may be configured (e.g., have a predetermined alignment) such that centrifugal force directs fluid into and/or avoids specific region(s) of the device 102. The first and second covers 116*a*,116*b* adhered to such a polymeric body 104 may also be curved, or may adopt the shape of the polymeric body 104 when applied to the first and second surfaces 104*a*,104*b*. Notably, the flow channels 112*a*,112*b* and connecting flow passages 114 may be configured as indicated above for use in a centrifuge even where the polymeric body 104 is not curved. In other words, a microfluidic diagnostic chip 102 according to any embodiment or example in this disclosure may have a flow architecture configured for use in a centrifuge.

Figure 7:
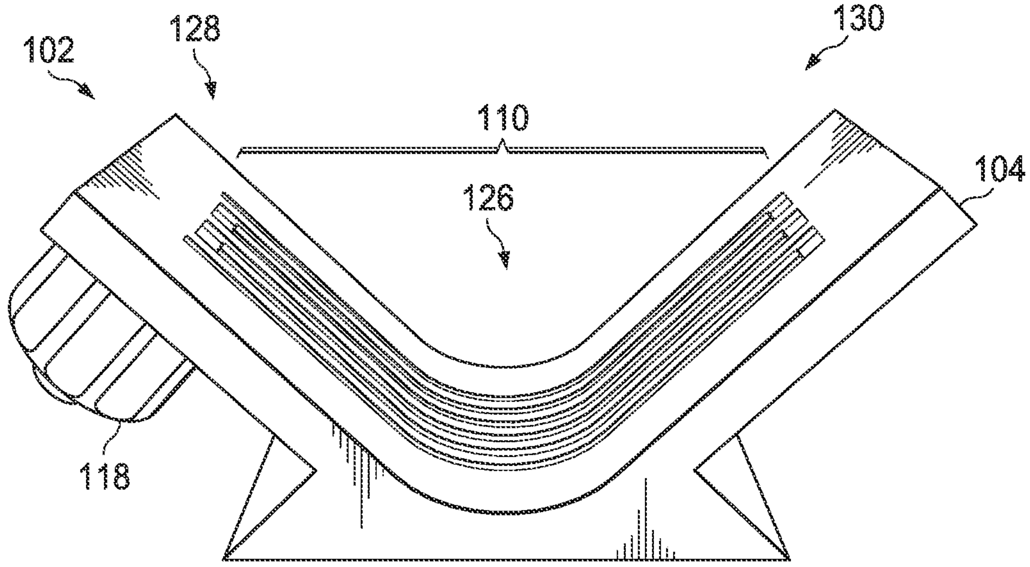
FIG. 7 shows an exemplary microfluidic diagnostic device comprising a bent polymeric body.
Figure 8A:
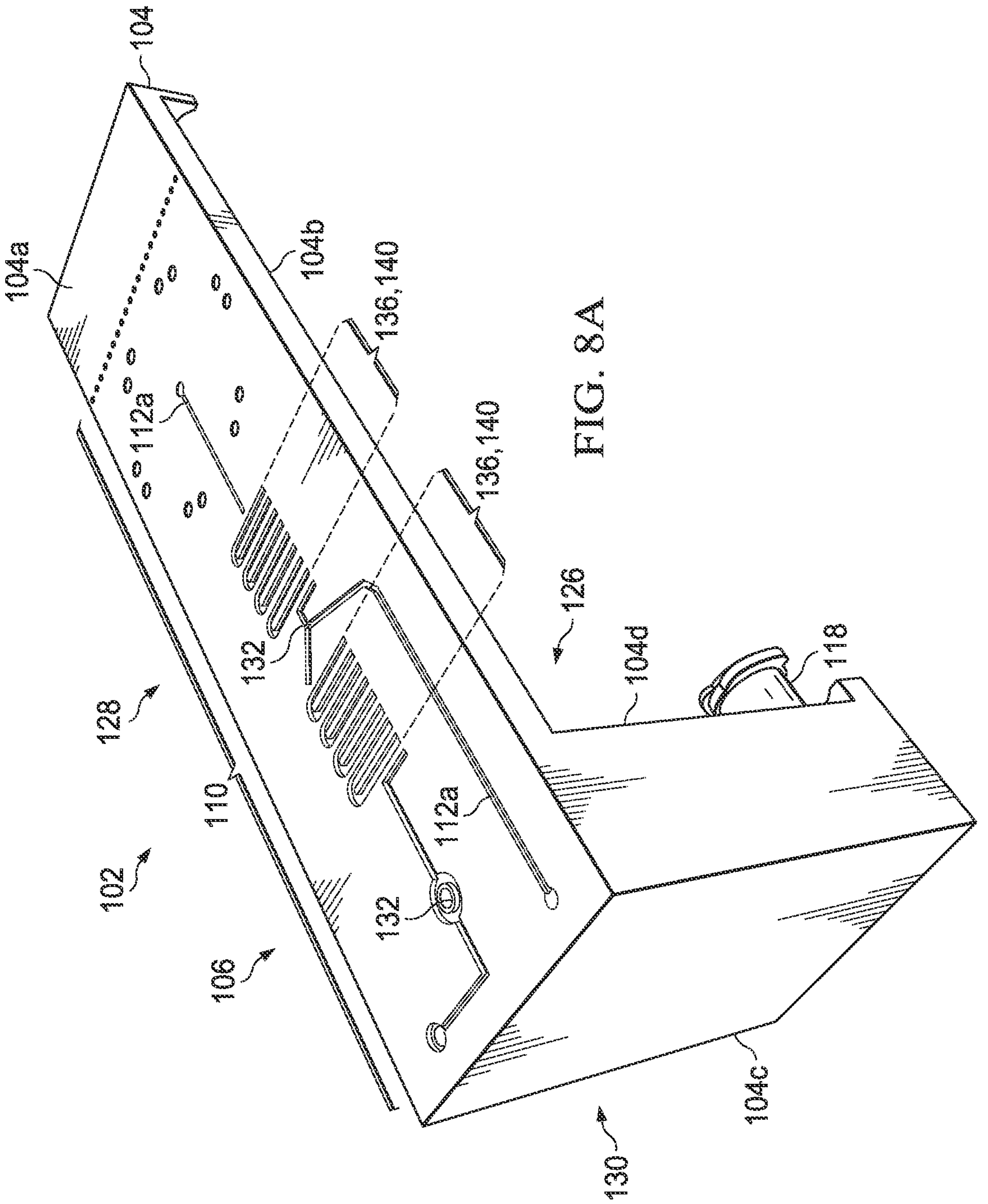
FIGS. 8A and 8B show front and back views of an exemplary microfluidic diagnostic device comprising an L-shaped polymeric body.
Figure 8B:
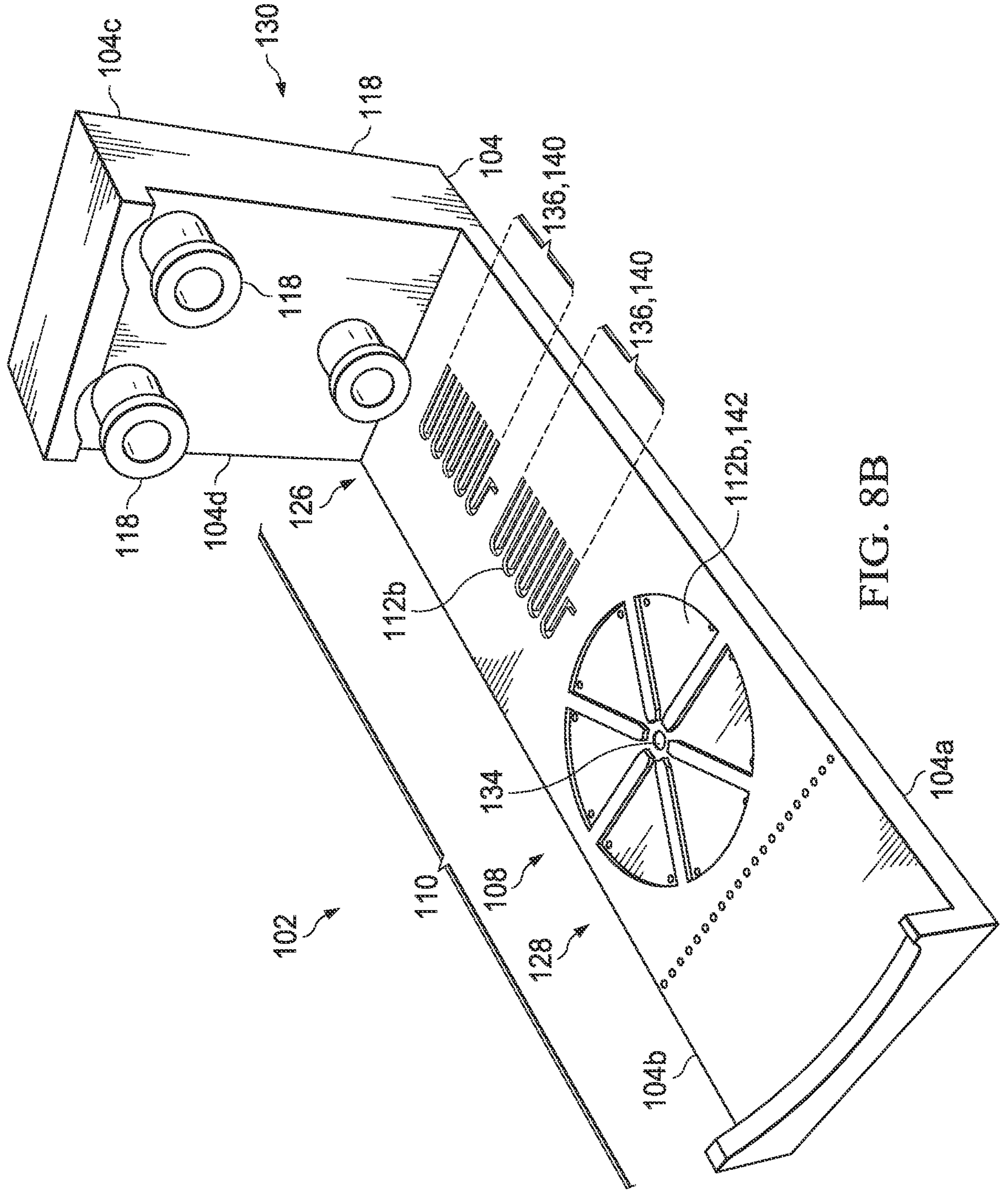

FIGS. 7, 8A and 8B show polymeric bodies 104 that include a bend, specifically an out-of-plane bend. The bend 126 effectively divides the polymeric body 104*a* into a first portion 128 and a second portion 130, where the first portion 128 includes the first and second opposing surfaces 104*a*, 104*b*, and the second portion 130 includes third and fourth opposing surfaces 104*c*,104*d*. As shown in the figures, surfaces described as being “opposing surfaces” (e.g., first and second opposing surfaces 104*a*,104*b*, or third and fourth opposing surfaces 104*c*,104*d*) may be understood to be separated by a thickness of the polymeric body 104 and may be, but are not necessarily, parallel to each other. The opposing surfaces may also be separated by an air gap or another solid material. The bend may comprise an angle in a range from about 5° to about 175°, or from about 45° to about 135°. Typically, the angle is in the range from 85° to 95°, or about 90°, as shown in FIGS. 7, 8A and 8B and also in FIGS. 4A and 4B, all of which provide examples of L-shaped microfluidic devices 102. The bend may be a sharp bend, as in FIGS. 8A and 8B, or a gentle bend with a predetermined radius of curvature, as in FIG. 7.

It is also contemplated, in examples in which the thickness of the polymeric body approaches the width and/or length of the device, and/or the polymeric body has a 3D shape different from a rectangular prism, that the chip 102 may comprise more than two first and second opposing surfaces 104*a*,104*b*. For example, flow channels may be mounted on six sides of a cube, in which these six surfaces are opposing surfaces. The opposing surfaces may be parallel, orthogonal, or have another angle that defines their relative orientation. For example, the flow channels may be mounted on the four surfaces of a regular pyramid.

As shown in FIG. 7, the continuous 3D flow pathway 110 may span the first and second portions 128,130 of the polymeric body 104. Alternatively, the continuous 3D flow pathway 110 may span only the first portion 128 of the polymeric body 104, as shown in FIGS. 8A and 8B. The second portion 130 of the polymeric body 104 may include one or more access ports 118 on the third and/or fourth opposing surfaces 104*c*,104*d*, which may be considered to be side surfaces, as described above in reference to FIGS. 4A and 4B. In some examples, only the second portion 130 of the polymeric body 104 includes the one or more access ports (e.g., as shown in FIGS. 8A and 8B); however, in other examples, the first portion 128 may also or alternatively include the one or more access ports 118 (e.g., as shown in FIG. 7). Each access port 118 is in fluid communication with the continuous 3D flow pathway 110, as explained above. Accordingly, each access port 118 is either directly connected to the continuous 3D flow pathway 110 or directly connected to an internal channel that connects with the continuous 3D flow pathway 110. As described above, each access port 118 may be configured to contain and/or connect to a swab, another microfluidic cartridge, a syringe, a needle or a tube, which may supply one or more liquid reagents and/or a sample to the microfluidic device 102. The access port(s) 118 may have a tapered and/or stepped internal diameter to avoiding clogging and optionally for establishing an interference fit. Also or alternatively, the access port(s) 118 may include threads 124 to couple with a mating connector (e.g., "Luer lock" fitting) attached to the tube or syringe.

Figure 9A:
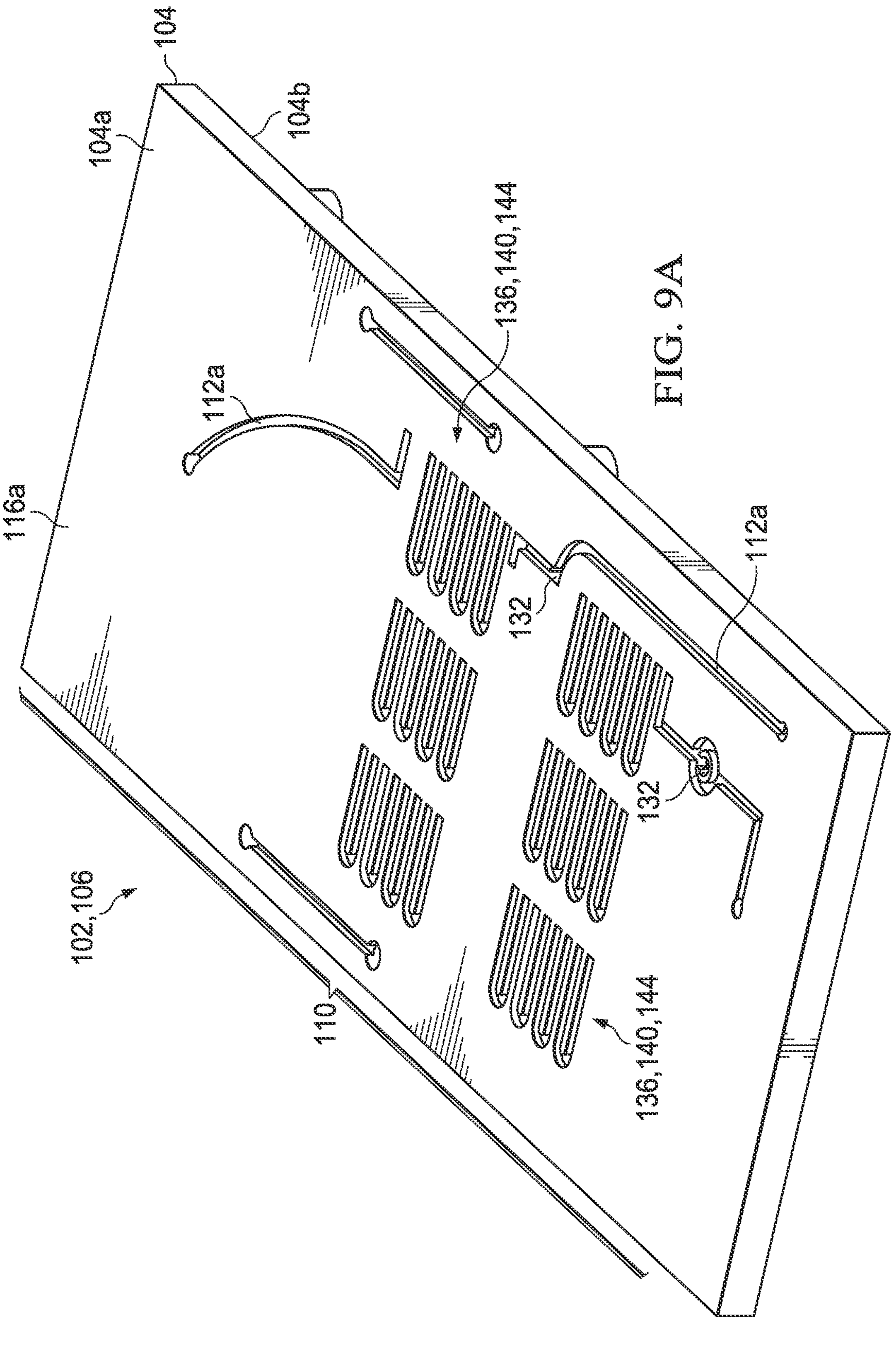
FIGS. 9A and 9B show front and back views of another exemplary microfluidic diagnostic device including a 3D flow architecture.
Figure 9B:
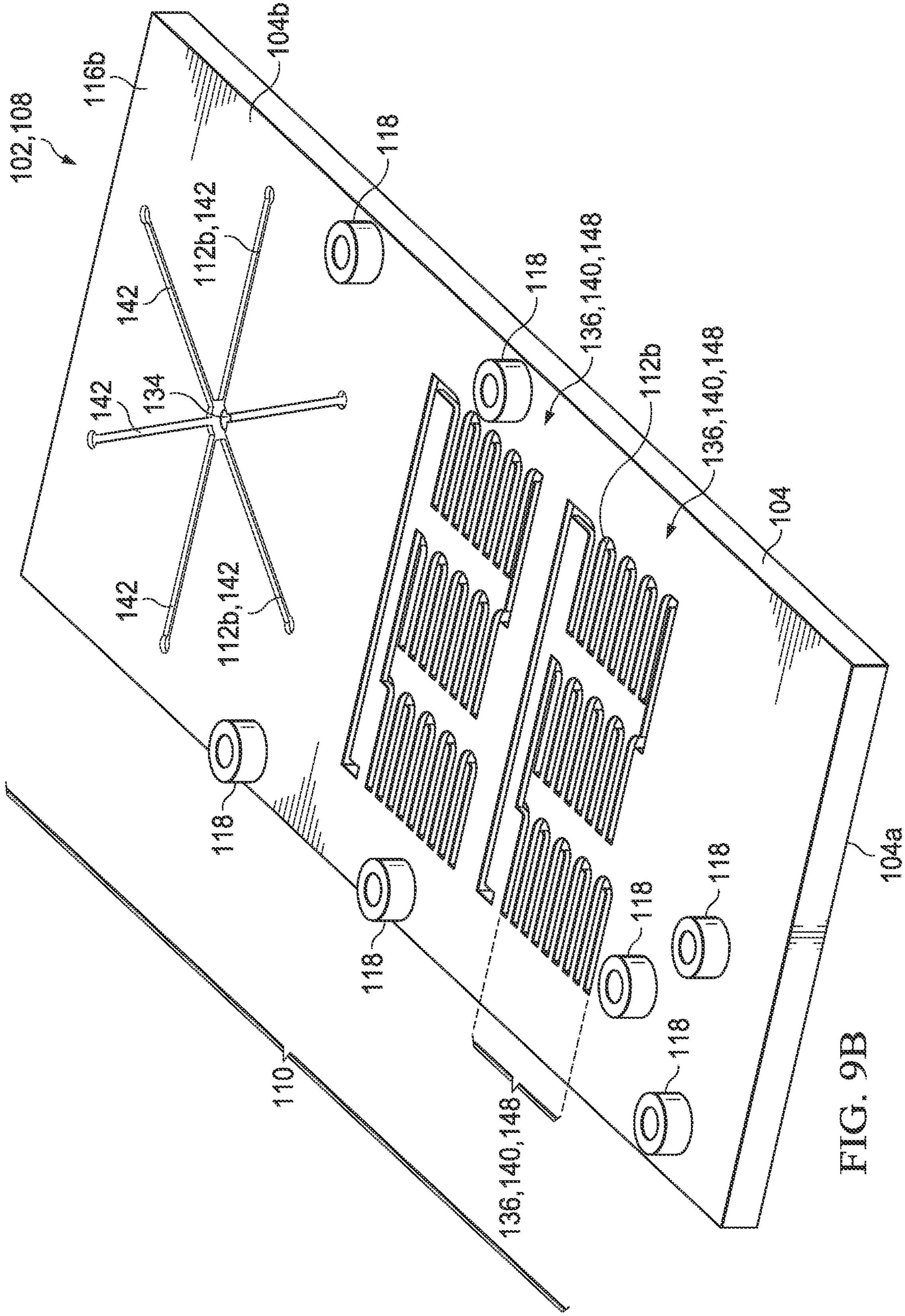

As indicated above, the continuous 3D flow pathway 110 may include one or more functional structures to facilitate fluid transport, mixing, lysing, amplification, storage and/or detection. For example, referring to the exemplary microfluidic chip 102 shown in FIGS. 9A and 9B (front 106 and back 108), the functional structures include flow channel junctions 132, flow channel splits or furcations 134, mixing structures 136 and detection reservoirs 142. The mixing structures 136 of this example are mixing channels 140; the exemplary microfluidic chip 102 of FIGS. 1A-1C described above also includes a mixing reservoir 138. Each of these functional structures may be formed by some combination of first flow channel(s) 112*a*, second flow channel(s) 112*b* and/or connecting flow passage(s) 114.

Figure 10:
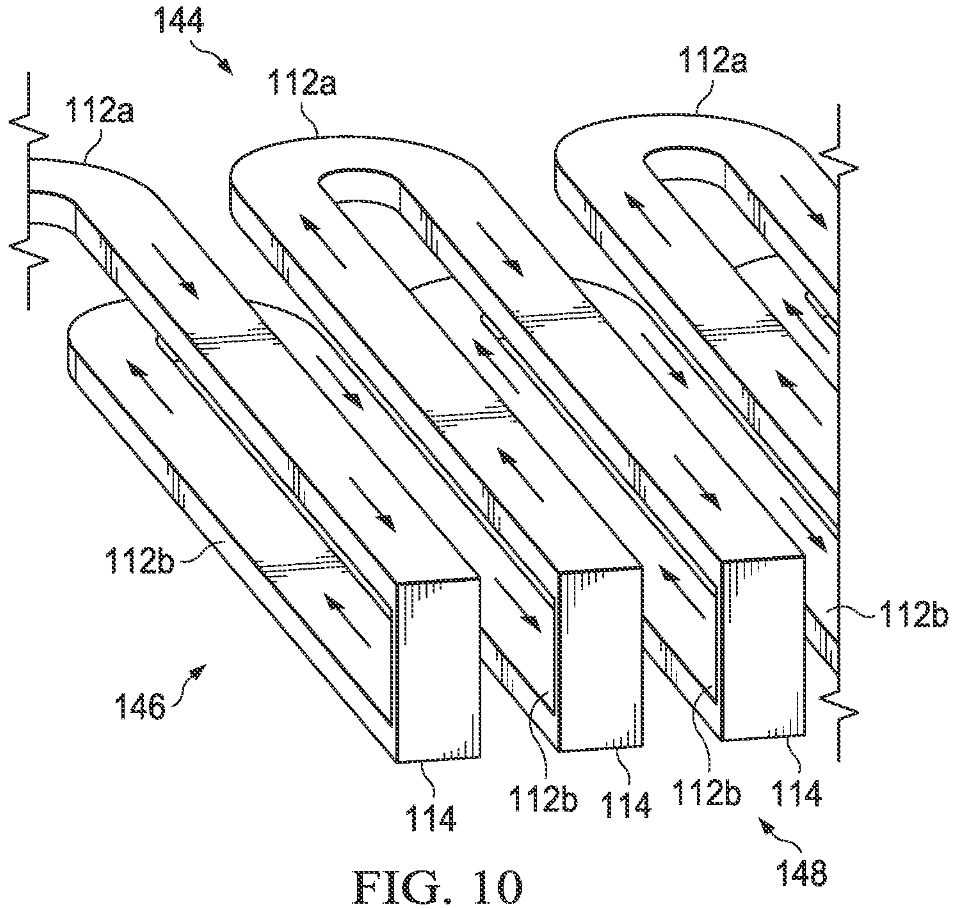
FIG. 10 is a schematic of a portion of an exemplary mixing channel.

For example, FIG. 10 shows a schematic of a portion of an exemplary mixing channel 140. The mixing channel 140 includes a grouping 144 of first flow channels 112*a* comprising a U-shape ("U-shaped first flow channels"), a grouping 146 of second flow channels 112*b* comprising a U-shape ("U-shaped second flow channels"), and a grouping 148 of connecting flow passages 114, where each of the connecting flow passages in the grouping 148 connects an end of one of the U-shaped first flow channels 112*a* to an end of one of the U-shaped second flow channels 112*b*. The arrows in the schematic indicate the direction of fluid flow through the mixing channel 140. Each connecting flow passage 114 may follow a path orthogonal to the first and second flow channels 112*a*,112*b* (and to the first and second opposing surfaces 104*a*,104*b*, which are not visible in this figure). Also or alternatively, one or more of the connecting flow passages 114 may follow an angled, straight, curved and/or bent path between the first and second flow channels 112*a*, 112*b*.

Notably, this 3D flow architecture leads to improved mixing compared to mixing channels having a traditional 2D flow architecture. Finite element simulations of fluid and analyte distribution within the flow reveal a 15% or more increase in mixing performance when the 3D mixing channel 140 described herein is compared to a 2D serpentine channel having the same flow path length.

Figure 11:
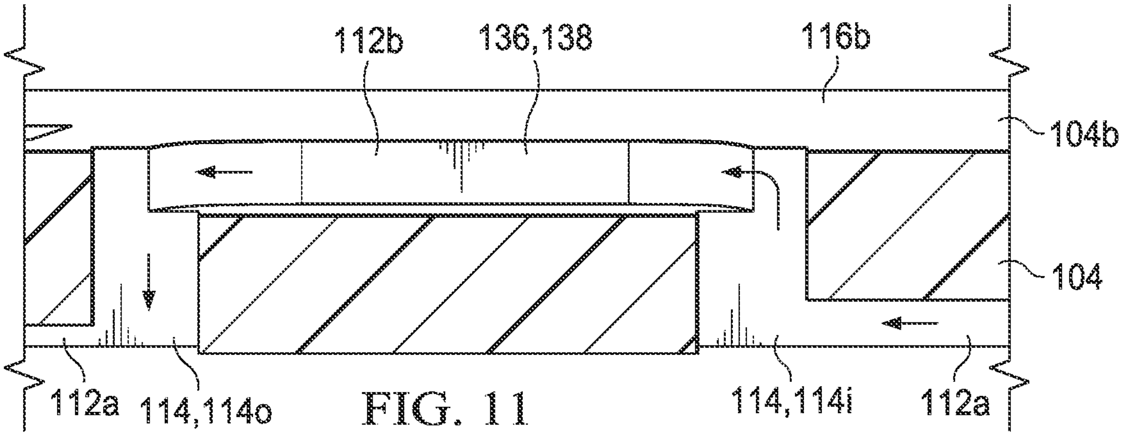
FIG. 11 is a sectional view of an exemplary mixing chamber.

Another example of a functional structure is illustrated in FIG. 11, which shows a sectional view of an exemplary mixing chamber 138. The mixing chamber 138 is formed by a second flow channel 112*b* having a width and length greater than its depth (see also FIG. 1B). An inlet to the mixing chamber 138 comprises an end of one of the connecting flow passages ("upstream flow passage") 114*i* and an outlet from the mixing chamber 138 comprises an end of another of the connecting flow passages ("downstream flow passage") 1140. The depth of the mixing chamber 138 may be constant as shown or may vary as a function of length and/or width. One or both of the upstream and downstream flow passages 114*i*,114*o* may follow a path orthogonal to the first and second flow channels 112*a*,112*b*, as illustrated, and/or one or both of the upstream and downstream flow passages 114*i*,114*o* may follow an angled, straight, curved and/or bent path between the first and second flow channels 112*a*,112*b*.

Figure 12:
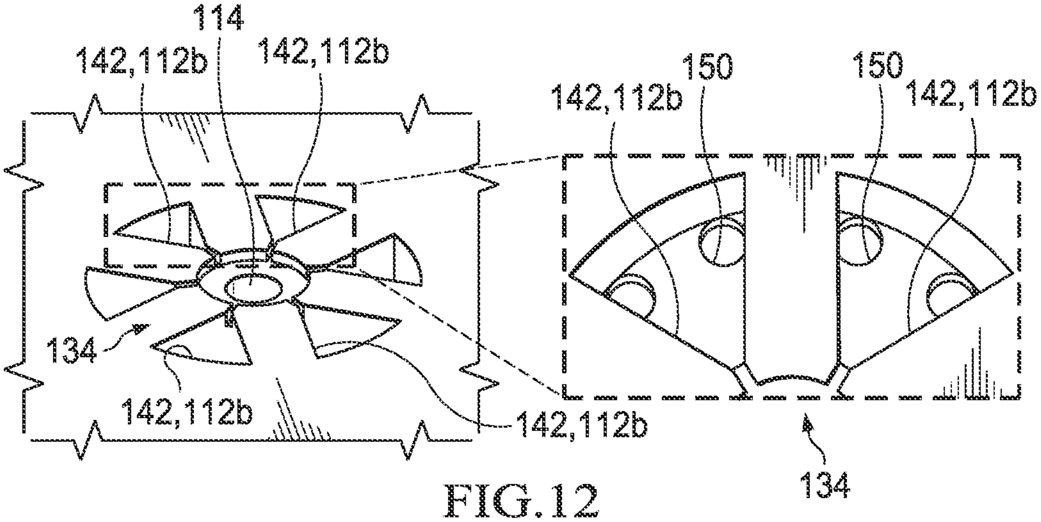
FIG. 12 shows a plan view of six detection reservoirs surrounding a flow channel furcation, where details of the detection reservoirs are shown in the inset.

In yet another example, FIG. 12 shows an exemplary flow channel furcation 134 that feeds into multiple detection reservoirs 142, which, when positioned with line-of-sight access to an optical detector, may be used for detection of a targeted pathogen or multiple targeted pathogens. In this example, the detection reservoirs 142 are pie-shaped and consequently may be referred to as "pie" reservoirs. In other examples, such as that shown in FIG. 8A, the detection reservoirs 142 may comprise elongated channel segments extending radially outward from the flow channel furcation 134. Generally speaking, the detection reservoirs 142 may be formed by a grouping of the first or second flow channels 112*a*,112*b* in fluid communication with the flow channel furcation 134, where fluid introduced into the flow channel furcation 134 is preferably evenly distributed to the detection reservoirs 142. Advantageously, the detection reservoirs 142 may radially surround the flow channel furcation 134. In this example there are six detection reservoirs 142, but any number of detection reservoirs (e.g., from 1 to 10, typically) may be employed. The detection reservoir(s) 142 may optionally include one or more outlets 150 for release of the fluid after detection, as shown in the inset of FIG. 11. The flow channel furcation 134 may be formed by an intersection of an end of one of the connecting flow passages 114 with one or more of, and more typically a plurality of the first or second flow channels 112*a*,112*b*. The connecting flow passage 114 feeding the flow channel furcation 134 may follow an orthogonal, straight, angled, curved, and/or bent path.

The detection reservoir(s) 142 can be prepared with biological molecules or primers that target specific pathogens, molecules, or chemicals to be detected. The molecules or primers can be delivered to a specific region of the polymeric body 104 or the cover(s) 116*a*,116*b* before or after assembly of the chip 102.

Also described in this disclosure is a point-of-care diagnostic system 100 comprising a microfluidic diagnostic device or chip 102, which may have any of the characteristics, features or configurations described herein, and an optical detector 160 positioned with line of sight access to the first or second opposing surface 104*a*,104*b*, or more particularly to the one or more detection reservoirs 142 that contain a processed fluid sample. As illustrated in FIG. 2, the optical detector 160 may include sensing optics 152, electronics 154, and optionally a power source 156, and may further be configured for use with a smart phone 158, e.g., to carry out image collection, analysis, storage and/or transmission.

As indicated above, the microfluidic chip 102 may be rapidly designed and manufactured. A method of making the microfluidic diagnostic device may comprise a first step of generating a computer-aided design of the polymeric body 104. To generate the computer-aided design, a user may provide various inputs, such as the desired microfluidic function, dimensions of specific features, material type, and flow structures specific to the intended application, into a computer-aided design program. These design inputs and dimensions may be generated automatically by a computer program or may be generated manually by a user. The design inputs may be stored in a database and retrieved for the purpose of manufacturing a microfluidic diagnostic chip. The design inputs and dimensions may be delivered over the internet such a through a web browser. By combining these inputs with simulations, prior results, and/or machine learning methods, the program can output a design for the polymeric body 104.

Figure 13:
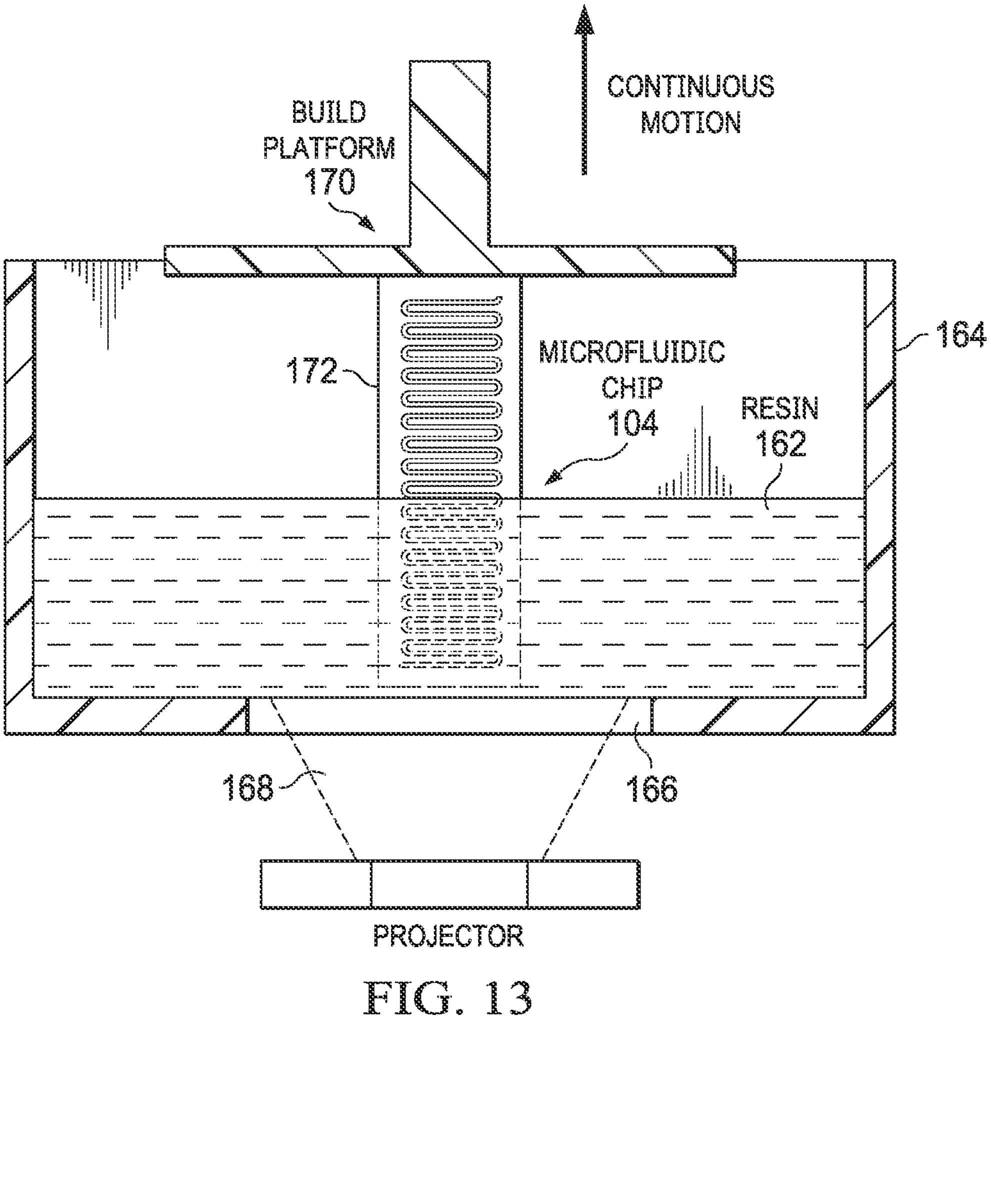
FIG. 13 is a schematic showing an exemplary additive manufacturing approach for constructing a microfluidic diagnostic chip according to any embodiment or example in this disclosure.

Once the computer-aided design is available (typically within about two hours), the polymeric body 104 may be constructed via additive manufacturing, such as continuous liquid interface production (CLIP) or extrusion-based 3D printing, which may be followed by a curing step (e.g., with ultraviolet radiation, heat, or a latent curing agent). Construction of the polymeric body 104 may be carried out within about six hours. The manufacturing resolution of additive manufacturing techniques, such as CLIP and 3D printing, may be 50 microns. Referring to FIG. 13, CLIP may entail illuminating a photopolymerizable liquid resin 162 contained in a reservoir 164 with ultraviolet (UV) light from below through a "window" 166 in the reservoir 164. The liquid resin 162 solidifies under UV illumination 168 while being pulled from the reservoir 164 by a build platform 170, thereby forming a solidified portion 172, and additional liquid resin is illuminated and solidifies, adding to the solidified portion 172 from below. Thus, the polymeric body 104 is gradually formed from the solidified portion 172. A persistent liquid interface is created to prevent the liquid resin from attaching to the window 166 and inhibiting the solidification process.

After construction of the polymeric body 104, the first cover 116*a* may be adhered to the first opposing surface 104*a* and the second cover 116*b* may be adhered to the second opposing surface 104*b*, thereby sealing the continuous 3D flow pathway 110 (e.g., the first and second flow passages 112*a*,112*b*) and forming the microfluidic diagnostic device 102. As described above in reference to FIG. 1C, the first and second covers 116*a*,116*b* may comprise glass or a polymer, and typically at least one of the first cover 116*a* and the second cover 116*b* is optically transparent. Preferably each of the first and second covers 116*a*,116*b* has a microscale thickness (e.g., 10-100 microns). In one example, one or both covers 116*a*,116*b* may comprise adhesive tape (e.g., transparent adhesive tape) which is readily available commercially and enables easy sealing of continuous 3D flow pathway 110.

The subject matter of the disclosure may also relate to the following aspects:

A first aspect relates to a microfluidic diagnostic device with a three-dimensional (3D) flow architecture, the microfluidic diagnostic device comprising: a polymeric body having first and second opposing surfaces and comprising: first flow channels in the first opposing surface; second flow channels in the second opposing surface; and connecting flow passages extending through a thickness of the polymeric body to connect the first flow channels to the second flow channels, thereby defining a continuous 3D flow pathway in the polymeric body; a first cover adhered to the first opposing surface to seal the first flow channels; a second cover adhered to the second opposing surface to seal the second flow channels; and one or more access ports in fluid communication with the continuous 3D flow pathway for introducing liquid reagent(s) and/or a sample into the polymeric body.

A second aspect relates to the microfluidic diagnostic device of the first aspect, wherein at least one of the first cover and the second cover is optically transparent.

A third aspect relates to the microfluidic diagnostic device of the first or second aspect, wherein at least one of the first and second covers comprises adhesive tape.

A fourth aspect relates to the microfluidic diagnostic device of any preceding aspect, wherein the polymeric body comprises a thermosetting polymer, and wherein the polymeric body is a monolithic polymeric body.

A fifth aspect relates to the microfluidic diagnostic device of any preceding aspect, wherein the polymeric body is fabricated by additive manufacturing.

A sixth aspect relates to the microfluidic diagnostic device of any preceding aspect, wherein the continuous 3D flow pathway in the polymeric body comprises one or more functional structures selected from the group consisting of: flow channel junction(s), flow channel furcation(s), mixing structure(s), and detection reservoir(s).

A seventh aspect relates to the microfluidic diagnostic device of any preceding aspect, wherein the continuous 3D flow pathway contains a total volume in a range from about 10 μL to about 1000 μL.

An eighth aspect relates to the microfluidic diagnostic device of any preceding aspect, wherein the one or more access ports are configured to contain and/or connect to a swab, a microfluidic cartridge, a syringe, a needle, and/or a tube.

A ninth aspect relates to the microfluidic diagnostic device of the eighth aspect, wherein the one or more access ports have a tapered and/or stepped internal diameter.

A tenth aspect relates to the microfluidic diagnostic device of the eighth or ninth aspect, wherein the one or more access ports include threads to couple with a mating connector attached to a tube or syringe.

An eleventh aspect relates to the microfluidic diagnostic device of any preceding aspect, wherein the continuous 3D flow pathway includes a mixing channel comprising: a grouping of the first flow channels, each of the first flow channels in the grouping being a U-shaped first flow channel; a grouping of the second flow channels, each of the second flow channels in the grouping being a U-shaped second flow channel; and a grouping of the connecting flow passages, each of the connecting flow passages in the grouping connecting an end of one of the U-shaped first flow channels to an end of one of the U-shaped second flow channels.

A twelfth aspect relates to the microfluidic diagnostic device of the eleventh aspect, wherein the connecting flow passages in the grouping follow a path orthogonal to the U-shaped first and second flow channels.

A thirteenth aspect relates to the microfluidic diagnostic device of any preceding aspect, wherein the continuous 3D flow pathway includes a mixing chamber comprising: one of the first or second flow channels having a width and a length greater than a depth thereof.

A fourteenth aspect relates to the microfluidic diagnostic device of the thirteenth aspect, wherein an inlet to the mixing chamber comprises an end of one of the connecting flow passages, the one of the connecting flow passages being an upstream flow passage, and wherein an outlet from the mixing chamber comprises an end of another of the connecting flow passages, the another of the connecting flow passages being a downstream flow passage.

A fifteenth aspect relates to the microfluidic diagnostic device of the fourteenth aspect, wherein one or both of the upstream and the downstream flow passages follow a path orthogonal to the mixing chamber.

A sixteenth aspect relates to the microfluidic diagnostic device of any preceding aspect, wherein the continuous 3D flow pathway includes a flow channel furcation in fluid communication with a plurality of detection reservoirs, and wherein fluid introduced into the flow channel furcation is evenly distributed to the detection reservoirs.

A seventeenth aspect relates to the microfluidic diagnostic device of the sixteenth aspect, wherein the detection reservoirs radially surround the flow channel furcation.

An eighteenth aspect relates to the microfluidic diagnostic device of the sixteenth or the seventeenth aspects, wherein an inlet to the flow channel furcation comprises an end of one of the connecting flow passages, the one of the connecting flow passages following a path orthogonal to the detection reservoirs.

A nineteenth aspect relates to the microfluidic diagnostic device of any preceding aspect, wherein one or both of the first and second opposing surfaces are planar.

A twentieth aspect relates to the microfluidic diagnostic device of any preceding aspect, wherein one or both of the first and second opposing surfaces include a curve.

A twenty-first aspect relates to the microfluidic diagnostic device of any preceding aspect being configured for diagnostic use in a centrifuge, wherein the first and second flow channels and/or the connecting flow passages are configured such that centrifugal force directs fluid into and/or avoids specific region(s) of the polymeric body.

A twenty-second aspect relates to the microfluidic diagnostic device of any preceding aspect, wherein the polymeric body includes a bend comprising an angle in a range from about 45° to about 135°.

A twenty-third aspect relates to the microfluidic diagnostic device of any preceding aspect, further comprising an electrical sensor integrated with the polymeric body, the first cover and/or the second cover.

A twenty-fourth aspect relates to a point-of-care system comprising: the microfluidic diagnostic device of any preceding aspect; and an optical detector positioned with line of sight access to the first or second opposing surface.

A twenty-fifth aspect relates to the point-of-care system of the twenty-fourth aspect, wherein the optical detector is configured for use with a smart phone.

A twenty-sixth aspect relates to a diagnostic method comprising: providing the microfluidic diagnostic device of any of the first through twenty-third aspects; introducing one or more liquid reagents and a sample sequentially or simultaneously into the one or more access ports for delivery to the continuous 3D flow path, whereby reactions and/or mixing occur and a processed fluid sample is formed and contained; positioning the microfluidic diagnostic device such that an optical detector has line-of-sight access to the processed fluid sample; and impinging light on the processed fluid sample to carry out optical detection.

A twenty-seventh aspect relates to a method of making the microfluidic diagnostic device of any one of of the first through twenty-third aspects, the method comprising: generating a computer aided design of the polymeric body; constructing the polymeric body via additive manufacturing; and adhering the first cover to the first opposing surface and the second cover to the second opposing surface, thereby sealing the first and second flow passages and forming the microfluidic diagnostic device.

A twenty-eighth aspect relates to the method of the twenty-seventh aspect, wherein the additive manufacturing comprises continuous liquid interface production (CLIP) or 3D printing.

A twenty-ninth aspect relates to the method of the twenty-seventh or twenty-eighth aspect, wherein the polymeric body is constructed with a manufacturing resolution of 50 microns.

A thirtieth aspect relates to the method of any one of the twenty-seventh through the twenty-ninth aspects carried out in six hours or less.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A microfluidic diagnostic device with a three-dimensional (3D) flow architecture, the microfluidic diagnostic device comprising:

a polymeric body having first and second external opposing surfaces and comprising:

first flow channels in the first external opposing surface;

second flow channels in the second external opposing surface; and connecting flow passages extending through a thickness of the polymeric body to connect the first flow channels to the second flow channels, thereby defining a continuous 3D flow pathway in the polymeric body;

a first cover adhered to the first external opposing surface to seal the first flow channels;

a second cover adhered to the second external opposing surface to seal the second flow channels; and one or more access ports in fluid communication with the continuous 3D flow pathway for introducing liquid reagent(s) and/or a sample into the polymeric body.

2. The microfluidic diagnostic device of claim 1, wherein at least one of the first cover and the second cover is optically transparent.

3. The microfluidic diagnostic device of claim 1, wherein the polymeric body comprises a thermosetting polymer.

4. The microfluidic diagnostic device of claim 1, wherein the continuous 3D flow pathway contains a total volume in a range from about 10 μL to about 1000 μL.

5. The microfluidic diagnostic device of claim 1, wherein the one or more access ports are configured to contain and/or connect to a swab, a microfluidic cartridge, a syringe, a needle, and/or a tube.

6. The microfluidic diagnostic device of claim 1, wherein the continuous 3D flow pathway includes a mixing channel comprising:

a grouping of the first flow channels, each of the first flow channels in the grouping being a U-shaped first flow channel in the first external opposing surface;

a grouping of the second flow channels, each of the second flow channels in the grouping being a U-shaped second flow channel in the second external opposing surface; and a grouping of the connecting flow passages, each of the connecting flow passages in the grouping connecting an end of one of the U-shaped first flow channels to an end of one of the U-shaped second flow channels.

7. The microfluidic diagnostic device of claim 6, wherein the connecting flow passages in the grouping follow a path orthogonal to the U-shaped first and second flow channels.

8. The microfluidic diagnostic device of claim 1, wherein the continuous 3D flow pathway includes a mixing chamber comprising:

one of the first or second flow channels having a width and a length greater than a depth thereof.

9. The microfluidic diagnostic device of claim 1, wherein the continuous 3D flow pathway includes a flow channel furcation in fluid communication with a plurality of detection reservoirs, and wherein fluid introduced into the flow channel furcation is evenly distributed to the detection reservoirs.

10. The microfluidic diagnostic device of claim 9, wherein the detection reservoirs radially surround the flow channel furcation.

11. The microfluidic diagnostic device of claim 9, wherein an inlet to the flow channel furcation comprises an end of one of the connecting flow passages, the one of the connecting flow passages following a path orthogonal to the detection reservoirs.

12. The microfluidic diagnostic device of claim 1, wherein one or both of the first and second opposing surfaces are planar.

13. The microfluidic diagnostic device of claim 1, wherein one or both of the first and second opposing surfaces include a curve.

14. The microfluidic diagnostic device of claim 1, further comprising an electrical sensor integrated with the polymeric body, the first cover and/or the second cover.

15. A point-of-care system comprising:

the microfluidic diagnostic device of claim 1; and an optical detector positioned with line of sight access to the first or second opposing surface.

16. The point-of-care system of claim 15, wherein the optical detector is configured for use with a smart phone.

17. A diagnostic method comprising:

providing the microfluidic diagnostic device of claim 1;

introducing one or more liquid reagents and a sample sequentially or simultaneously into the one or more access ports for delivery to the continuous 3D flow path, whereby reactions and/or mixing occur and a processed fluid sample is formed and contained;

positioning the microfluidic diagnostic device such that an optical detector has line-of-sight access to the processed fluid sample; and impinging light on the processed fluid sample to carry out optical detection.

18. A method of making the microfluidic diagnostic device of claim 1, the method comprising:

generating a computer aided design of the polymeric body;

constructing the polymeric body via additive manufacturing; and adhering the first cover to the first opposing surface and the second cover to the second opposing surface, thereby sealing the first and second flow passages and forming the microfluidic diagnostic device.

19. The method of claim 18, wherein the additive manufacturing comprises continuous liquid interface production (CLIP) or 3D printing.

20. The method of claim 18, wherein the polymeric body is constructed with a manufacturing resolution of ≤50 microns.

21. The method of claim 18, further comprising:

after additive manufacturing, curing the polymeric body with ultraviolet radiation, wherein the polymeric body comprises a polymer whose shape is formed by exposure to radiation.

22. The microfluidic diagnostic device of claim 1, wherein the polymeric body comprises a polymer selected from the group consisting of polylactic acid (PLA), acrylonitrile butadiene styrene (ABS), polyurethane, an acrylate, and an epoxide.

23. The microfluidic diagnostic device of claim 1, wherein the polymeric body is a monolithic polymeric body devoid of any bonds or seams.

24. The microfluidic diagnostic device of claim 1, wherein the access ports include threads configured to couple with a mating connector.

* * * * *